(12) United States Patent
Yamamoto et al.

(10) Patent No.: US 12,224,801 B2
(45) Date of Patent: Feb. 11, 2025

(54) TRANSMISSION SYSTEM, TRANSMISSION METHOD, AND TRANSMISSION DEVICE

(71) Applicant: SONY GROUP CORPORATION, Tokyo (JP)

(72) Inventors: Masanari Yamamoto, Kanagawa (JP); Kazuaki Toba, Kanagawa (JP); Hiroshi Morita, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 231 days.

(21) Appl. No.: 18/008,317

(22) PCT Filed: Jun. 21, 2021

(86) PCT No.: PCT/JP2021/023311
§ 371 (c)(1),
(2) Date: Dec. 5, 2022

(87) PCT Pub. No.: WO2022/004449
PCT Pub. Date: Jan. 6, 2022

(65) Prior Publication Data
US 2023/0208524 A1 Jun. 29, 2023

(30) Foreign Application Priority Data
Jul. 3, 2020 (JP) .................. 2020-115313

(51) Int. Cl.
*H04B 10/00* (2013.01)
*H04B 10/27* (2013.01)
*H04J 14/00* (2006.01)

(52) U.S. Cl.
CPC .................... *H04B 10/27* (2013.01)

(58) Field of Classification Search
CPC ..................... H04B 10/27; H04B 10/278
See application file for complete search history.

(56) References Cited

U.S. PATENT DOCUMENTS

| 2013/0094857 A1* | 4/2013 | Hinderthur | ........ H04Q 11/0067 398/58 |
| 2015/0263810 A1* | 9/2015 | Yao | ...................... H04B 10/272 398/58 |

FOREIGN PATENT DOCUMENTS

| JP | H10-032545 A | 2/1998 |
| JP | 2001-352313 A | 12/2001 |

(Continued)

*Primary Examiner* — Daniel G Dobson
(74) *Attorney, Agent, or Firm* — Paratus Law Group, PLLC

(57) ABSTRACT

There is provided a transmission system, a transmission method, and a transmission device that make it possible to inhibit deterioration in quality of transmission signals while reducing the number of times of compensation on transmission signals in a case where a plurality of devices is connected in a daisy chain. The transmission system includes a plurality of sub devices and a main device that are connected in a daisy chain. The main device includes a main connector connected to the first sub device of the plurality of sub devices, the main connector being configured to output transmission signals of a plurality of channels. The plurality of sub devices each includes a first sub connector connected to a preceding device, the first sub connector being configured to receive the transmission signals, a compensation unit disposed to correspond to a channel obtained as a result of thinning out, at predetermined intervals, channels other than a channel of an own device signal used by the sub device to which the compensation unit belongs, the compensation unit being configured to perform compensation on the transmission signals, and a second sub connector configured to shift channels of the transmission signals received from the preceding device other than the own device signal by the number of channels of the own device signal and output the transmission signals. The present technology is applicable to, for example, a multi-monitor system.

19 Claims, 13 Drawing Sheets

(56) References Cited

FOREIGN PATENT DOCUMENTS

| | | | |
|---|---|---|---|
| JP | 2004-297235 | A | 10/2004 |
| JP | 2012-113205 | A | 6/2012 |
| JP | 2012-138712 | A | 7/2012 |
| JP | 2018-099757 | A | 6/2018 |

* cited by examiner

FIG. 6

| ch | MAIN TO SUB #1 | SUB #1 TO SUB #2 | SUB #2 TO SUB #3 | SUB #3 TO SUB #4 |
|---|---|---|---|---|
| 1 | IMAGE SIGNAL #1 | IMAGE SIGNAL #2 | IMAGE SIGNAL #3 | IMAGE SIGNAL #4 |
| 2 | IMAGE SIGNAL #2 | IMAGE SIGNAL #3 | IMAGE SIGNAL #4 | --- |
| 3 | IMAGE SIGNAL #3 | IMAGE SIGNAL #4 | --- | --- |
| 4 | IMAGE SIGNAL #4 | | | |

FIG. 9

| ch | MAIN TO SUB #1 | SUB #1 TO SUB #2 | SUB #2 TO SUB #3 | SUB #3 TO SUB #4 | SUB #4 TO MAIN |
|---|---|---|---|---|---|
| 1 | IMAGE SIGNAL #1 | IMAGE SIGNAL #2 | IMAGE SIGNAL #3 | IMAGE SIGNAL #4 | CONTROL SIGNAL #1 |
| 2 | IMAGE SIGNAL #2 | IMAGE SIGNAL #3 | IMAGE SIGNAL #4 | CONTROL SIGNAL #1 | CONTROL SIGNAL #2 |
| 3 | IMAGE SIGNAL #3 | IMAGE SIGNAL #4 | CONTROL SIGNAL #1 | CONTROL SIGNAL #2 | CONTROL SIGNAL #3 |
| 4 | IMAGE SIGNAL #4 | CONTROL SIGNAL #1 | CONTROL SIGNAL #2 | CONTROL SIGNAL #3 | CONTROL SIGNAL #4 |

FIG. 12

| ch | MAIN TO SUB #1 | SUB #1 TO SUB #2 | SUB #2 TO SUB #3 | SUB #3 TO SUB #4 | SUB #4 TO SUB #5 |
|---|---|---|---|---|---|
| 1 | IMAGE SIGNAL #1 | IMAGE SIGNAL #2 | IMAGE SIGNAL #3 | IMAGE SIGNAL #4 | IMAGE SIGNAL #5 |
| 2 | IMAGE SIGNAL #2 | IMAGE SIGNAL #3 | IMAGE SIGNAL #4 | IMAGE SIGNAL #5 | IMAGE SIGNAL #6 |
| 3 | IMAGE SIGNAL #3 | IMAGE SIGNAL #4 | IMAGE SIGNAL #5 | IMAGE SIGNAL #6 | IMAGE SIGNAL #7 |
| 4 | IMAGE SIGNAL #4 | IMAGE SIGNAL #5 | IMAGE SIGNAL #6 | IMAGE SIGNAL #7 | IMAGE SIGNAL #8 |
| 5 | IMAGE SIGNAL #5 | IMAGE SIGNAL #6 | IMAGE SIGNAL #7 | IMAGE SIGNAL #8 | CONTROL SIGNAL #1 |
| 6 | IMAGE SIGNAL #6 | IMAGE SIGNAL #7 | IMAGE SIGNAL #8 | CONTROL SIGNAL #1 | CONTROL SIGNAL #2 |
| 7 | IMAGE SIGNAL #7 | IMAGE SIGNAL #8 | CONTROL SIGNAL #1 | CONTROL SIGNAL #2 | CONTROL SIGNAL #3 |
| 8 | IMAGE SIGNAL #8 | CONTROL SIGNAL #1 | CONTROL SIGNAL #2 | CONTROL SIGNAL #3 | CONTROL SIGNAL #4 |

| ch | SUB #5 TO SUB #6 | SUB #6 TO SUB #7 | SUB #7 TO SUB #8 | SUB #8 TO MAIN |
|---|---|---|---|---|
| 1 | IMAGE SIGNAL #6 | IMAGE SIGNAL #7 | IMAGE SIGNAL #8 | CONTROL SIGNAL #1 |
| 2 | IMAGE SIGNAL #7 | IMAGE SIGNAL #8 | CONTROL SIGNAL #1 | CONTROL SIGNAL #2 |
| 3 | IMAGE SIGNAL #8 | CONTROL SIGNAL #1 | CONTROL SIGNAL #2 | CONTROL SIGNAL #3 |
| 4 | CONTROL SIGNAL #1 | CONTROL SIGNAL #2 | CONTROL SIGNAL #3 | CONTROL SIGNAL #4 |
| 5 | CONTROL SIGNAL #2 | CONTROL SIGNAL #3 | CONTROL SIGNAL #4 | CONTROL SIGNAL #5 |
| 6 | CONTROL SIGNAL #3 | CONTROL SIGNAL #4 | CONTROL SIGNAL #5 | CONTROL SIGNAL #6 |
| 7 | CONTROL SIGNAL #4 | CONTROL SIGNAL #5 | CONTROL SIGNAL #6 | CONTROL SIGNAL #7 |
| 8 | CONTROL SIGNAL #5 | CONTROL SIGNAL #6 | CONTROL SIGNAL #7 | CONTROL SIGNAL #8 |

TRANSMISSION SYSTEM, TRANSMISSION METHOD, AND TRANSMISSION DEVICE

CROSS REFERENCE TO PRIOR APPLICATION

This application is a National Stage Patent Application of PCT International Patent Application No. PCT/JP2021/023311 (filed on Jun. 21, 2021) under 35 U.S.C. § 371, which claims priority to Japanese Patent Application No. 2020-115313 (filed on Jul. 3, 2020), which are all hereby incorporated by reference in their entirety.

TECHNICAL FIELD

The present technology relates to a transmission system, a transmission method, and a transmission device, and more particularly, to a transmission system, a transmission method, and a transmission device suitable for use in a case where a plurality of devices is connected in a daisy chain.

BACKGROUND ART

As an inter-device connection scheme applied to a case where a plurality of devices works in a coordinated manner, a daisy chain topology in which devices are connected together in sequence has been widely used (see, for example, Patent Document 1).

The daisy chain topology allows, if at least one sub device is connected to a main device that is an output source of a transmission signal, each of the other sub devices to receive the transmission signal via the adjacent sub device even if the other sub devices are not directly connected to the main device. Therefore, the daisy chain topology can simplify wiring as compared with, for example, a star topology in which the main device and each sub device are connected in a peer-to-peer manner.

CITATION LIST

Patent Document

Patent Document 1: Japanese Patent Application Laid-Open No. H10-32545

SUMMARY OF THE INVENTION

Problems to be Solved by the Invention

In the daisy chain topology, however, the larger the number of connected devices, the greater the loss in transmission signal, so that a possibility that the quality of the transmission signal in each sub device does not satisfy a desired level becomes higher and higher toward the end of the daisy chain.

A possible approach to such a problem is that each sub device is provided with, for example, a compensation circuit that performs compensation on the transmission signal. Providing the compensation circuit, however, increases cost, circuit scale, power consumption, and heat generation.

The present technology has been made in view of such circumstances, and it is therefore an object of the present technology to inhibit deterioration in quality of a transmission signal while reducing the number of times of compensation on the transmission signal in a case where a plurality of devices is connected in a daisy chain.

Solutions to Problems

A transmission system according to a first aspect of the present technology includes a plurality of sub devices and a main device that are connected in a daisy chain, in which the main device includes a first main connector connected to a first sub device of the plurality of sub devices, the first main connector being configured to output transmission signals of a plurality of channels, and each of the plurality of sub devices includes: a first sub connector connected to a preceding device, the first sub connector being configured to receive the transmission signals; a compensation unit disposed to correspond to a channel obtained as a result of thinning out, at predetermined channel intervals, channels other than a channel of an own device signal that is the transmission signal used by the sub device to which the compensation unit belongs, the compensation unit being configured to perform compensation on the transmission signals; and a second sub connector configured to shift, in a case where the second sub connector is connected to a following device, channels of the transmission signals received from the preceding device other than the own device signal by the number of channels of the own device signal and output the transmission signals.

A transmission method for a plurality of sub devices and a main device that are connected in a daisy chain according to the first aspect of the present technology includes causing the main device to output transmission signals of a plurality of channels to the sub device that is a first sub device of the plurality of sub devices; and causing each of the plurality of sub devices to perform compensation on the transmission signals obtained as a result of thinning out, at predetermined channel intervals, the transmission signals received from a preceding device other than an own device signal that is the transmission signal used by the sub device, shift, in a case where the sub device is connected to a following device, channels of the transmission signals received from the preceding device other than the own device signal by the number of channels of the own device signal, and output the transmission signals co the following device.

According to the first aspect of the present technology, the main device and the plurality of sub devices are connected in a daisy chain, the main device outputs the transmission signals of the plurality of channels to the sub device that is the first sub device of the plurality of sub devices, and each of the plurality of sub devices performs compensation on the transmission signals obtained as a result of thinning out, at predetermined intervals, the transmission signals received from the preceding device other than the own device signal that is the transmission signal used by the sub device, shifts, in a case where the sub device is connected to the following device, channels of the transmission signals received from the preceding device other than the own device signal by the number of channels of the own device signal, and outputs the transmission signals to the following device.

A transmission device according to a second aspect of the present technology includes: a first connector connected to a preceding device, the first connector being configured to receive a transmission signal; a compensation unit disposed to correspond to a channel obtained as a result of thinning out, at predetermined intervals, channels other than a channel of an own device signal that is the transmission signal used by a sub device to which the compensation unit belongs, the compensation unit being configured to perform compensation on the transmission signal; and a second connector configured to shift, in a case where the second connector is connected to a following device, channels of the transmission signals received from the preceding device other than the own device signal by the number of channels of the own device signal and output the transmission signals.

According to the second aspect of the present technology, the compensation unit disposed to correspond to a channel obtained as a result of thinning out, at predetermined intervals, channels other than the channel of the own device signal that is the transmission signal used by the sub device to which the compensation unit belongs performs compensation on the transmission signal. In a case where the sub device to which the compensation unit belongs is connected to the following device, channels of the transmission signals received from the preceding device other than the own device signal are shifted by the number of channels of the own device signal, and the transmission signals are output.

A transmission device according to a third aspect of the present technology includes: a first connector connected to a first sub device of a plurality of the sub devices connected in a daisy chain, the first connector being configured to output transmission signals of a plurality of channels; a second connector connected to a last sub device of the plurality of sub devices, the second connector being configured to receive a control signal containing feedback information indicating a state of the transmission signal used by each of the plurality of sub devices and output from each of the plurality of sub devices; and a controller configured to control the transmission signals on the basis of the feedback information contained in the control signal from each of the plurality of sub devices.

A transmission device according to the third aspect of the present technology, the transmission signals of the plurality of channels are output to the first sub device of the plurality of the sub devices connected in a daisy chain, the control signal containing the feedback information indicating a state of the transmission signal used by each of the plurality of sub devices and output from each of the plurality of sub devices is received from the last sub device of the plurality of sub devices, and the transmission signals are controlled on the basis of the feedback information contained in the control signal from each of the plurality of sub devices.

BRIEF DESCRIPTION OF DRAWINGS

FIG. 3 is a diagram illustrating a second configuration example of the sub device illustrated in. FIG. 1.

FIG. 6 is a diagram illustrating details of signals that are transmitted between the devices in the transmission system illustrated in FIG. 4.

FIG. 9 is a diagram illustrating details of signals that are transmitted between the devices in the transmission system illustrated in FIG. 7.

FIG. 12 is a diagram illustrating details of signals that are transmitted between the devices in the transmission system illustrated in FIG. 10.

MODE FOR CARRYING OUT THE INVENTION

Hereinafter, modes for carrying out the present technology will be described. The description will be given in the following order.
1. Background of the present technology
2. First embodiment
3. Second embodiment
4. Third embodiment
5. Modification
6. Others 1. Background of the Present Technology First, the background of the present technology will be described with reference to FIGS. 1 to 3.

Figure 1:
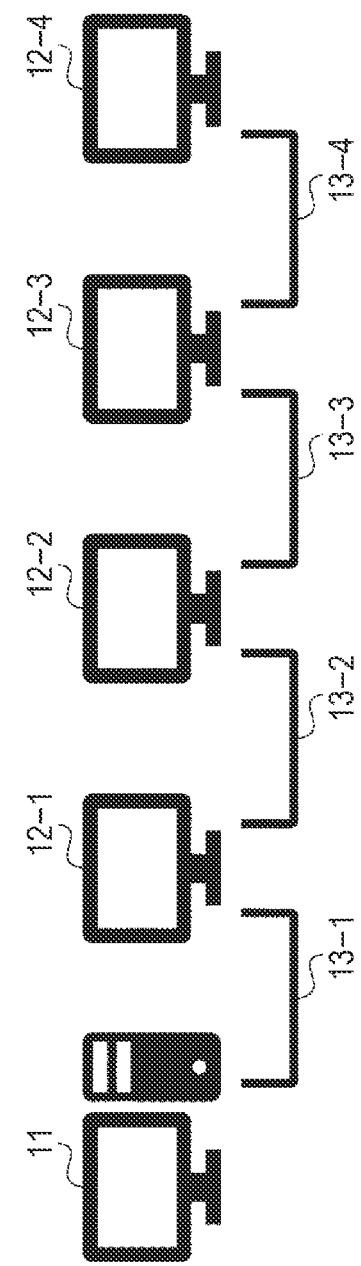
FIG. 1 is a diagram illustrating a configuration example of a transmission system using a daisy chain topology.

FIG. 1 illustrates a configuration example of a transmission system 1 that is daisy-chained using an optical interface.

The transmission system 1 includes a main device 11 and sub devices 12-1 to 12-4. The main device 11 and the sub device 12-1 are connected over an optical cable 13-1. The sub device 12-1 and the sub device 12-2 are connected over an optical cable 13-2. The sub device 12.-2 and the sub device 12-3 are connected over an optical cable 13-3. The sub device 12-3 and the sub device 12-4 are connected over an optical cable 13-4.

Note that a description will be given below of an example where the transmission system 1 constitutes a multi-monitor system such as a multi-tile display that constructs one image by causing the sub devices 12-1 to 12-4 to output images of different channels in a coordinated manner.

Figure 2:
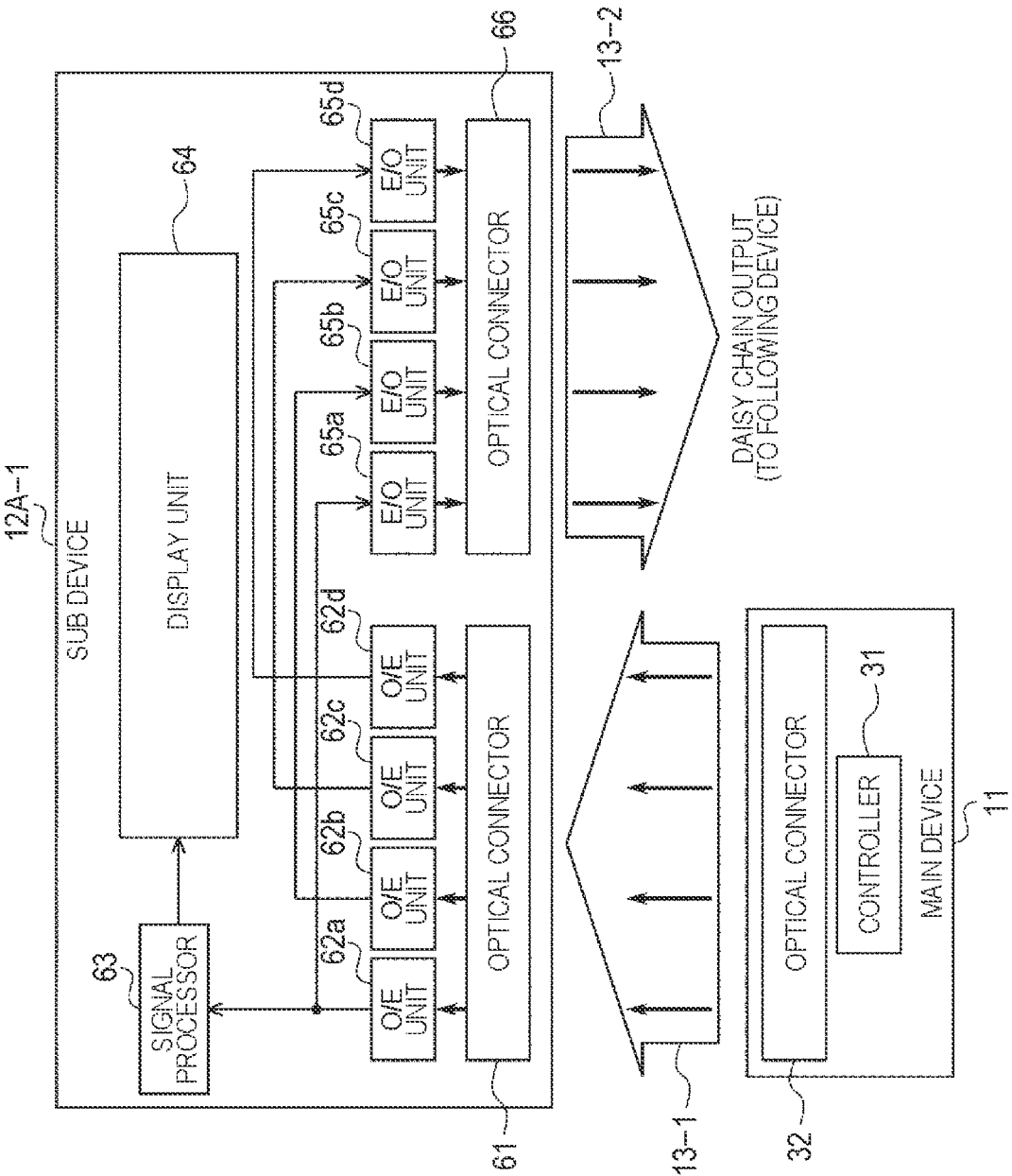
FIG. 2 is a diagram illustrating a first configuration example of a sub device illustrated in FIG. 1.

FIG. 2 illustrates a configuration example of the main device 11 illustrated in FIG. 1 and a sub device 12A-1 corresponding to a first embodiment of the sub device 12-1.

The main device 11 includes a controller 31 and an optical connector 32.

The controller 31 generates image signals of channels 1 to 4, generates optical signals of the channels 1 to 4 each containing the image signal of a corresponding channel, and supplies the optical signals to the optical connector 32.

The optical connector 32 outputs the optical signals of the channels 1 to 4 to the sub device 12A-1 over the optical cable 13-1.

The sub device 12A-1 includes an optical connector 61, opto-electric converters 62a to 62d, a signal processor 63, a display unit 64, electro-optic converters 65a to 65d, and an optical connector 66.

Note that the opto-electric converter is hereinafter referred to as an optic to electric (O/E) unit. Furthermore, the electro-optic converter is hereinafter referred to as an electric to optic (E/O) unit.

The optical signals of the channels 1 to 4 are input to the optical connector 61 over the optical cable 13-1. The optical connector 61 supplies the optical signals of the channels 1 to 4 to the O/E units 62a to 62d, respectively.

The O/E units 62a to 62d convert the optical signals of the channels 1 to 4 into electrical signals, respectively, and supplies the electrical signals of the channels 1 to 4 to the E/O units 65*a* to 65*d*, respectively. Furthermore, the O/E unit 62*a* further supplies the electrical signal of the channel 1 to the signal processor 63.

The signal processor 63 performs predetermined signal processing on the electrical signal of the channel 1 and supplies an image signal of the channel 1 thus obtained to the display unit 64.

The display unit 64 displays an image based on the image signal of the channel 1.

The E/O units 65*a* to 65*d* convert the electrical signals of the channels 1 to 4 into optical signals, respectively, and supply the optical signals of the channels 1 to 4 to the optical connector 66, respectively.

The optical connector 66 outputs the optical signals of the channels 1 to 4 to the following sub device 12A-2 over the optical cable 13-2.

Although no detailed description and illustration will be given, the sub devices 12A-2 to 12A-4 are similar in configuration to the sub device 12A-1 and perform processing similar to the processing performed by the sub device 12A-1. Furthermore, the sub devices 12A-2 to 12A-4 display images based on the image signals of the channels 2 to 4, respectively.

Note that, is a case where it is not necessary to identify the sub devices 12A-1 to 12A-4, the sub devices 12A-1 to 12A-4 are each hereinafter simply referred to as a sub device 12A. In a case where it is not necessary to identify the O/E units 62*a* to 62*d*, the O/E units 62*a* to 62*d* are each hereinafter simply referred to as an O/E unit 62. In a case where it is not necessary to identify the E/O units 65*a* to 65*d*, the E/O units 65*a* to 65*d* are each hereinafter simply referred to as an E/O unit 65.

As described above, each sub device 12A converts the optical signals of all the channels into electrical signals and then reconverts the electrical signals into optical signals. As a result, in the optical connector 32 of the main device 11, and the optical connector 61 and the optical connector 66 of the sub device 12A, optical signal loss such as attenuation caused due to influence of reflection, positional accuracy, or the like. This in turn reduces the optical signal loss caused by the transmission between devices and guarantees the quality of the optical signal transmitted to each sub device 12A.

The configuration where the four O/E units 62 and the four E/O units 65 are provided in each sub device 12A, however, leads to increases in cost, circuit scale, power consumption, and the heat generation. Furthermore, the larger the number of connected sub devices 12A and the number of optical signal channels, the greater the cost, the circuit scale, the power consumption, and the heat generation.

Figure 3:
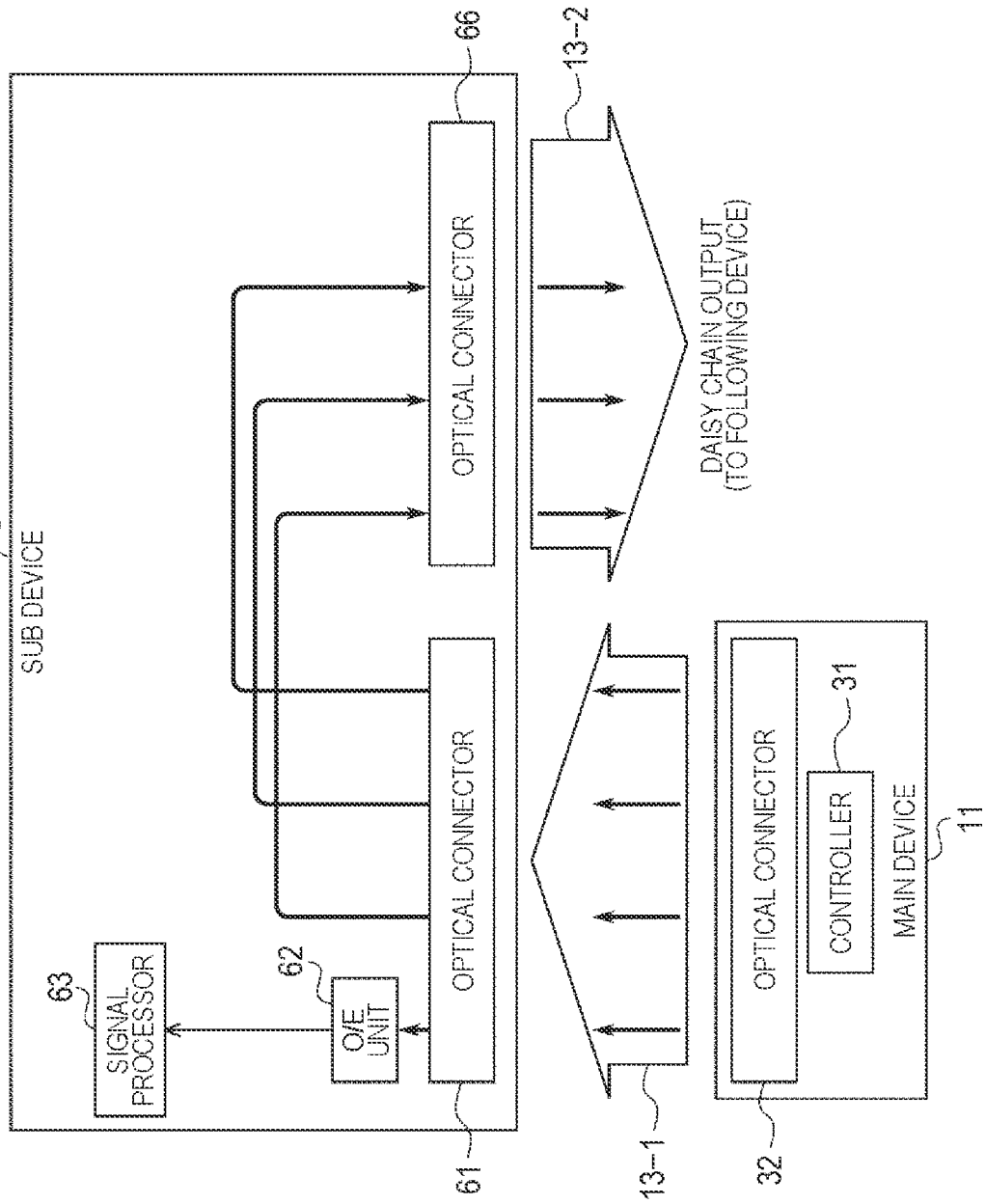

FIG. 3 illustrates a configuration example of the main device 11 illustrated in FIG. 1 and a sub device 12B-1 corresponding to a second embodiment of the sub device 12-1. Note that, in the drawing, portions corresponding to the portions illustrated in FIG. 1 will be denoted by the same reference numerals, and no description will be given of such portions as appropriate.

The sub device 12B-1 is similar in configuration to the node of the optical communication system disclosed in Patent Document 1 described above. Specifically, the sub device 12B-1 includes an optical connector 61, an O/E unit 62, a signal processor 63, and an optical connector 66.

In the sub device 12B-1, among the optical signals of the channels 1 to 4 input to the optical connector 61, the optical signal of the channel 1 is supplied to the O/E unit 62.

The O/E unit 62 converts the optical signal of the channel 1 into an electrical signal and supplies the electrical signal of the channel 1 to the signal processor 63.

The signal processor 63 performs predetermined signal processing on the electrical signal of the channel On the other hand, among the optical signals of the channels 1 to 4 input to the optical connector 61, the optical signals of the channels 2 to 4 are directly supplied to the channels 1 to 3 of the optical connector 66.

As a result, each of the channels of the optical signals output from the optical connector 66 (sub device 12B-1) is shifted by one channel that becomes unoccupied as a result of excluding the optical signal of the channel 1. That is, the optical signals of the channels 2 to 4 containing the image signals of the channels 2 to 4 are shifted to the channels 1 to 3 and output from the sub device 12B-1 to a sub device 12B-2.

Although no detailed description and illustration will be given, the sub device 12B-2 to a sub device 12B-4 are also similar in configuration to the sub device 12B-1 and perform processing similar to the processing performed by the sub device 12B-1. Furthermore, the sub devices 12B-2 to 12B-4 display images based on the image signals of the channels 2 to 4, respectively, Note that, in a case where it is not necessary to identify the sub devices 12B-1 to 12E-4, the sub devices 12B-1 to 12B-4 are each hereinafter simply referred to as a sub device 12B.

Furthermore, each sub device 12B shifts the optical signals other than the optical signal used by the sub device 12B by the number of channels (in this case, one channel) that become unoccupied as a result of excluding the optical signal used by the sub device 12B and outputs the optical signals to the following sub device 12B. For example, the optical signals of the channels 1 and 2 containing the image signals of the channels 3 and 4 are output from the sub device 12B-2 to the sub device 12B-3. The optical signal of channel 1 containing the image signal of the channel 4 is output from the sub device 12B-3 to a sub device 12B-4.

It is therefore possible to construct a multi-monitor system by connecting the sub devices 12B similar in configuration in a daisy chain without any special setting or calibration. That is, it is possible to implement the multi-monitor system only by causing each sub device 12B to display the image based on the image signal contained in the optical signal of the channel 1 among the input optical signals.

On the other hand, each sub device 12B does not perform compensation on the optical signals to be transmitted to the following sub device 123, so that the optical signal loss in each sub device 12B becomes larger and larger toward the end of the daisy chain. For example, each optical signal passes through optical connectors $2n$ times before reaching the n-th sub device 12B, so that the optical signal loss increases in proportion to the connection order of the sub device 12B. Therefore, as the number of connected sub devices 12B increases, a possibility of the occurrence of a problem such as deterioration in image quality or no image output in each sub device 12B becomes higher and higher toward the end of the daisy chain.

The present technology has been made in view of such circumstances, and it is therefore an object of the present technology to make it possible to inhibit deterioration in Quality of a transmission signal while reducing the number of times of compensation on the transmission signal on a daisy chain topology.

2. First Embodiment

Next, the first embodiment of the present technology will be described with reference to FIGS. 4 to 6.

Figure 4:
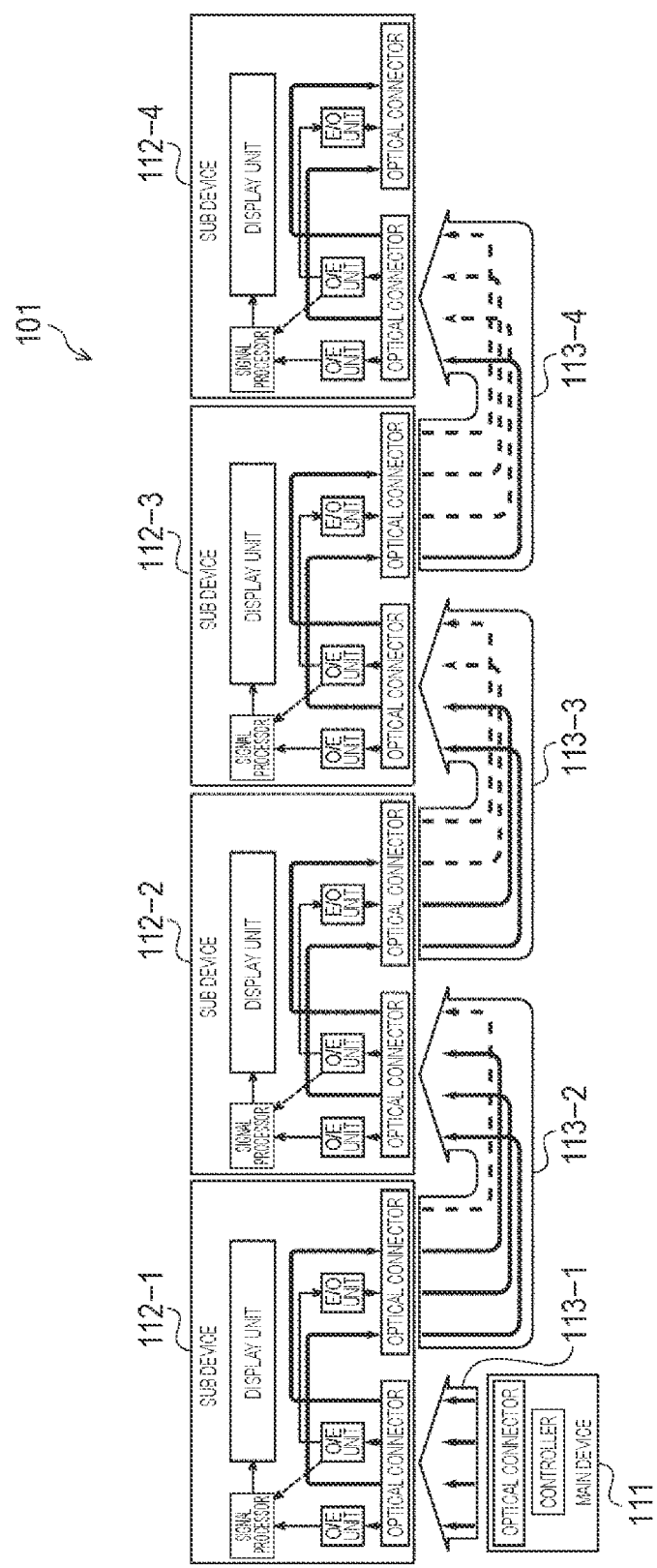
FIG. 4 is a diagram illustrating a first embodiment of a transmission system to which the present technology is applied.

FIG. 4 illustrates a configuration example of a transmission system 101 corresponding to the first embodiment of the transmission system to which the present technology is applied.

The transmission system 101 includes a main device 111 and sub devices 112-1 to 112-4. The main device 111 and the sub devices 112-1 to 112-4 are daisy-chained in an open loop.

Specifically, the main device 111 and the sub device 112-1 are connected over an optical cable 113-1. The sub device 112-1 and the sub device 112-2 are connected over an optical cable 113-2. The sub device 112-2 and the sub device 112-3 are connected over an optical cable 113-3. The sub device 112-3 and the sub device 112-4 are connected over an optical cable 113-4.

The sub devices 112-1 to 112-4 constitute a multi-monitor system such as a multi-tile display. That is, the sub devices 112-1 to 112-4 each display a different image to construct one image in a coordinated manner.

Note that, in a case where it is not necessary to identify the sub devices 112-1 to 112-4, the sub devices 112-1 to 112-4 are each hereinafter simply referred to as a sub device 112.

Figure 5:
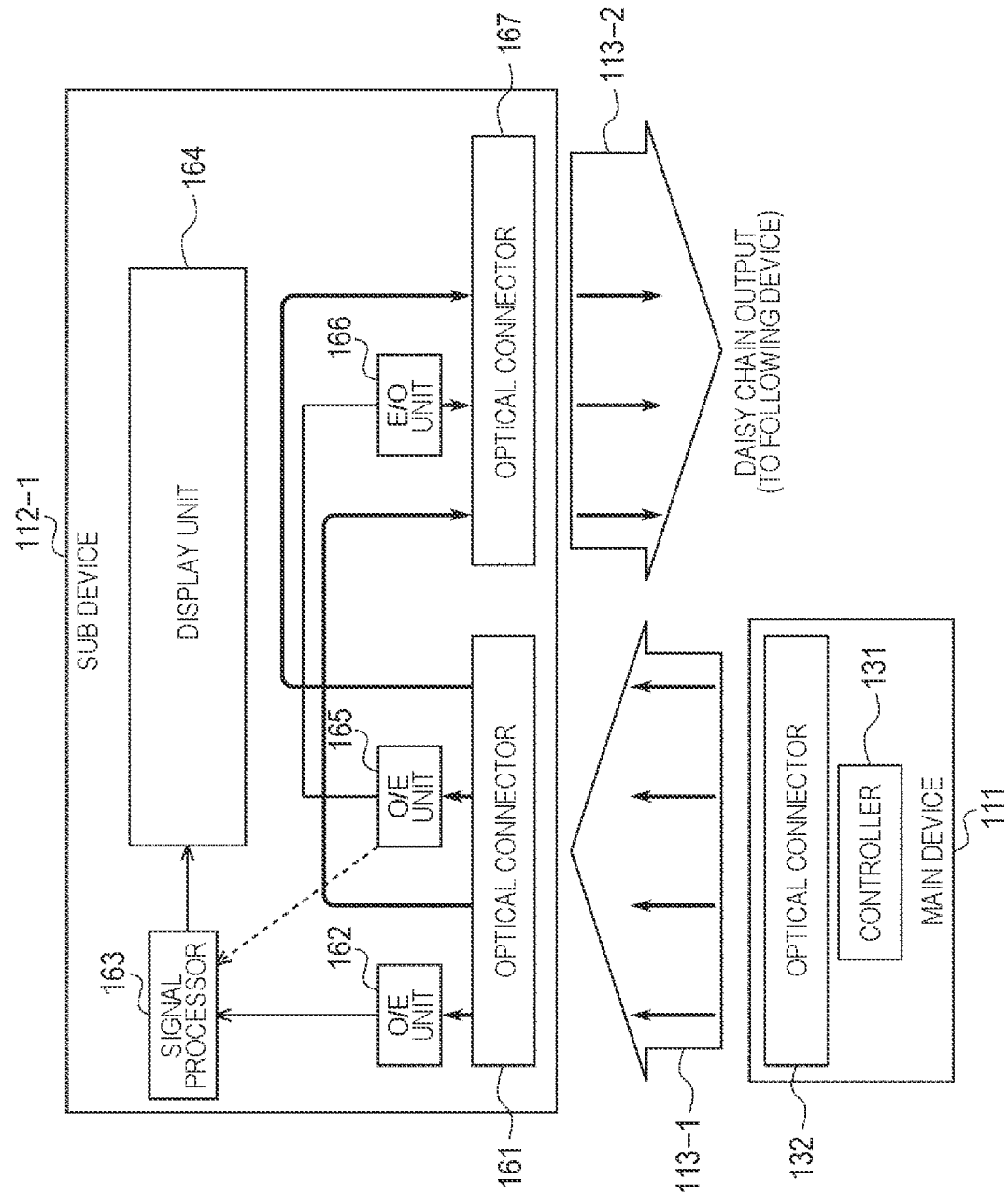
FIG. 5 is an enlarged view of a main device and a sub device illustrated in FIG. 4.

FIG. 5 is as enlarged view of the main device 111 and the sub device 112-1 illustrated in FIG. 4.

The main device 111 includes a controller 131 and an optical connector 132.

The controller 131 generates image signals of channels 1 to 4 and generates optical signals of the channels 1 to 4 that are transmission signals each containing the image signal of a corresponding channel. The controller 131 supplies the optical signals of the channels 1 to 4 to the optical connector 132.

The optical connector 132 is an output unit capable of outputting optical signals of four channels. The optical connector 132 is connected to the first sub device 112-1 over the optical cable 113-1 and outputs the optical signals of the channels 1 to 4 to the sub device 112-1.

The sub device 112-1 includes an optical connector 161, an O/E unit 162, a signal processor 163, a display unit 164, an O/E unit 165, an E/O unit 166, and an optical connector 167.

The optical connector 161 is an input unit capable of receiving optical signals of four channels. The optical connector 161 is connected to the main device 111 over the optical cable 113-1 and receives the optical signals of the channels 1 to 4. The optical connector 161 supplies the optical signal of the channel 1 to the O/E unit 162. The optical connector 161 supplies the optical signal of the channel 3 to the O/E unit 165. The optical connector 161 shifts the optical signals of the channels 2 and 4 to a higher order by one channel and supplies the optical signals to the channels 1 and 3 of the optical connector 167, respectively.

The O/E unit 162 converts the optical signal of the channel 1 into an electrical signal of a different form and supplies the electrical signal of the channel 1 to the signal processor 163, The signal processor 163 performs processing of displaying the image based on the electrical signal of the channel 1. Specifically, the signal processor 163 controls the display of the image on the display unit 164 by performing predetermined signal processing on the electrical signal of the channel 1 and supplying an image signal of the channel 1 thus obtained to the display unit. 164.

The display unit 164 includes, for example, a display. The display unit 164 displays the image based on the image signal of the channel 1.

Here, passing through the two optical connectors, the optical connector 132 of the main device 111 and the optical connector 161 of the sub device 112-1, gives rise to a loss in the optical signal of the channel 1 used for image display in the sub device 112-1.

The O/E unit. 165 is disposed to correspond to a channel obtained as a result of thinning out, at predetermined intervals, the channels 2 to 4 other than the channel 1 used by the signal processor 163. Specifically, the O/E unit 165 is disposed to correspond to only the channel 3, and no O/E unit 165 is disposed to correspond to the channel 2 or the channel 4. Then, the O/E unit 165 converts the optical signal of the channel 3 into an electrical signal of a different form and supplies the electrical signal to the E/O unit 166. Furthermore, in a case of receipt of the optical signal, the O/E unit 165 notifies the signal processor 163 of the receipt of the optical signal.

The E/O unit 166 is disposed to correspond to a channel that is the same as the channel to which the O/E unit 165 corresponds. The E/O unit 166 converts the electrical signal of the channel 3 into an optical signal of a different form, shifts the optical signal to a higher order by one channel, and supplies the optical signal to the channel 2 of the optical connector 167.

Here, the O/E unit 165 and the E/O unit 166 constitute a compensation unit that performs compensation on the optical signal of the channel 3. That is, the optical signal of the channel 3 is subjected to opto-electric conversion by the O/E unit 165 and then subjected to electro-optic conversion. (inverse conversion) by the E/O unit 166. This compensates for the loss in the optical signal of the channel 3 caused by passing through the optical connector 132 of the main device 111 and the optical connector 161 of the sub device 112-1. Note that, for example, the compensation unit may perform waveform shaping in addition to the compensation for the loss in the optical signal.

On the other hand, performing the compensation. processing (opto-electric conversion and electro-optic conversion) on the optical signal of the channel 3 gives rise to a delay in transmission of the optical signal of the channel 3.

On the other hand, the optical signals of the channels 2 and 4 are supplied to the optical connector 167 without being subjected to compensation for the loss caused by passing through the optical connector 132 of the main device 111 and the optical connector 161 of the sub device 112-1.

On the other hand, the optical signals of the channels 2 and 4 are not subjected to the compensation. processing, so that no transmission delay occurs.

The optical connector 167 is an output unit capable of outputting optical signals of four channels. The optical connector 167 is connected to the following sub device 112-2 over the optical cable 113-2 and outputs the optical signals of the channels 1 to 4.

Note that, although no detailed description will be given, the sub devices 112-2 to 112-4 are similar in configuration to the sub device 112-1 and perform processing similar to the processing performed by the sub device 112-1.

FIG. 6 illustrates details or the signals that are transmitted between the devices of the transmission system 101. Note that, in FIG. 6, main denotes the main device 111, and subs

1 to #4 denote the sub devices 112-1 to 112-4, respectively. Image signals #1 to #4 denote the image signals of the channels 1 to 4, respectively.

Furthermore, a channel represented by a bold frame and bold letters denotes a channel used for image display by each sub device 112 of a transmission destination. A hatched channel denotes a channel of which the optical signal is subjected to compensation by each sub device 112 of the transmission destination.

The main device 111 outputs the optical signals of the channels 1 to 4 containing the image signals of the channels 1 to 4, respectively, to the sub device 112-1.

The sub device 112-1 displays the image based on the image signal of the channel 1 contained in the optical signal of the channel 1. The image signal of the channel 1 suffers a loss caused by passing through the two optical connectors, the optical connector 132 of the main device 111 and the optical connector 161 of the sub device 112-1. Furthermore, the sub device 112-1 compensates for the loss in the optical signal of the channel 3 containing the image signal of the channel 3.

The sub device 112-1 outputs, to the following sub device 112-2, the optical signals received from the main.

device 111 other than the optical signal of the channel 1 used by the sub device 112-1. At this time, the sub device 112-1 shifts the channels of the optical signals to be output by the number of channels (in this case, one channel) that become unoccupied as a result of excluding the optical signal of the channel 1. Therefore, the optical signals of the channels 1 to 3 containing the image signals of the channels 2 to 4, respectively, are transmitted from the sub device 112-1 to the sub device 112-2.

The sub device 112-2 displays the image based on the image signal of the channel 2 contained in the optical signal of the channel 1 .The image signal of the channel 2 suffers a loss caused by passing through the four optical connectors, the optical connector 132 of the main device 111, the optical connector 161 and the optical connector 167 of the sub device 112-1, and the optical connector 161 of the sub device 112-2. Furthermore, the sub device 112-1 compensates for the loss in the optical signal of the channel 3 containing the image signal of the channel 4.

The sub device 112-2 outputs, to the following sub device 112-3, the optical signals received from the sub device 112-1 other than the optical signal of the channel 1 used by the sub device 112-2. At this time, the sub device 112-2 shifts the channels of the optical signals to be output by the number of channels that become unoccupied as a result of excluding the optical signal of the channel 1. Therefore, the optical signals of the channels 1 and 2 containing the image signals of the channels 3 and 4, respectively, are transmitted from the sub device 112-2 to the sub device 112-3.

The sub device 112-3 outputs the image based on the image signal of the channel 3 contained in the optical signal of the channel 1. The image signal of the channel 3 suffers a loss caused by passing through, after being subjected to compensation in the sub device 111-1, the four optical connectors, the optical connector 167 of the sub device 112-1, the optical connector 161 and the optical connector 167 of the sub device 112-2, and the optical connector 161 of the sub device 112-3, after being subjected to compensation in the sub device 111-1.

The sub device 112-3 outputs, to the following sub device 112-4, the optical signals received from the sub device 112-2 other than the optical signal of the channel 1 used by the sub device 112-3. At this time, the sub device 112-3 shifts the channels of the optical signals to be output by the number of channels that become unoccupied as a result of excluding the optical signal of the channel 1. Therefore, the optical signal of the channel 1 containing the image signal of the channel 4 is transmitted from the sub device 112-3 to the sub device 112-4.

The sub device 112-4 outputs the image based on the image signal of the channel 4 contained in the optical signal of the channel 1. The image signal of the channel 4 suffers a loss caused by passing through, after being subjected to compensation in the sub device 112-2, the four optical connectors, the optical connector 167 of the sub device 112-2, the optical connector 161 and the optical connector 167 of the sub device 112-3, and the optical connector 161 of the sub device 112-4.

As described above, even if the compensation unit including the O/E unit. 165 and the E/O unit 166 is provided for not all the channels but some of the channels, it is possible to reduce a loss in the image signal (optical signal) caused as the image signal passes through the optical connector and guarantee the communication quality regardless of the connection order of each sub device 112. Specifically, the loss in the image signal of each channel is controlled to be less than or equal to a loss caused as the image signal passes through up to four optical connectors.

Note that the optical signal containing the image signal of the channel 1 used by the sub device 112-1 and the optical signal containing the image signal of the channel 2 used by the sub device 112-2 are not subjected to compensation (opto-electric conversion and electro-optic conversion) on the way, so that no transmission delay occurs. On the other hand, the optical signal containing the image signal of the channel 3 used by the sub device 112-3 is subjected to compensation by the sub device 112-1, so that a transmission delay occurs. Furthermore, the optical signal containing the image signal of the channel 4 used by the sub device 112-4 is subjected to compensation by the sub device 112-2, so that a transmission delay occurs.

As described above, the transmission delay differs in a manner that depends on a path through which the image signal of each channel passes to reach the sub device 112 in which the image signal is used. Therefore, in order to accurately synchronize timing of displaying the image in each sub device 112, it is necessary to compensate for the transmission delay.

Here, in a case of receipt of the optical signal, the O/E unit 165 of each sub device 112 notifies the signal processor 163 of the receipt of that the optical signal. This allows the signal processor 163 of each sub device 112 to detect, on the basis of whether the notification has been received from the O/E unit 165, the connection order of the sub device 112 to which the signal processor 163 belongs, that is, where the sub device 112 to which the signal processor 163 belongs is placed relative to the main device 111.

For example, in a case where the notification has been received from the O/E unit 165, the signal processor 163 of each sub device 112 can detect that the sub device 112 to which the signal processor 163 belongs is the first device (sub device 112-1) or the second device (sub device 112-2) from the main device 111. On the other hand, in a case where no notification has been from the O/E unit 165, the signal processor 163 of each sub device 112 can detect that the sub device 112 to which the signal processor 163 belongs is the third device (sub device 112-3) or the fourth device (sub device 112-4) from the main device 111.

Here, as described above, no delay occurs in. transmission of the image signal used by the sub device 112-1 and the sub device 112-2. On the other hand, a delay occurs in transmission of the image signals used by the sub device 112-3 and the sub device 112-4 because the image signals are each subjected to the compensation processing once.

On the other hand, for example, the controller 131 of the main device 111 adds a synchronization signal time-synchronized with the optical signal of each channel.

Then, the signal processor 163 of each sub device 112 controls timing of the image signal processing on the basis of the connection order of the device 112 to which the signal processor 163 belongs and the synchronization signal. For example, the signal processors 163 of the sub device 112-3 and the sub device 112-4 that use the image signal suffering a transmission delay each perform control so as to output the image with timing based on the synchronization signal. On the other hand, the signal processors 163 of the sub device 112-1 and the sub device 112-2 that use the image signal suffering no transmission delay each perform control so as to output the image with timing delayed from the timing based on the synchronization signal by a time required for each compensation processing on the optical signal.

It is therefore possible to synchronize the timing with which each sub device 112 displays the image without using complicated processing or mechanism.

3. Second Embodiment

Next, the second embodiment of the present technology will be described with reference to FIGS. 7 to 9.

Figure 7:
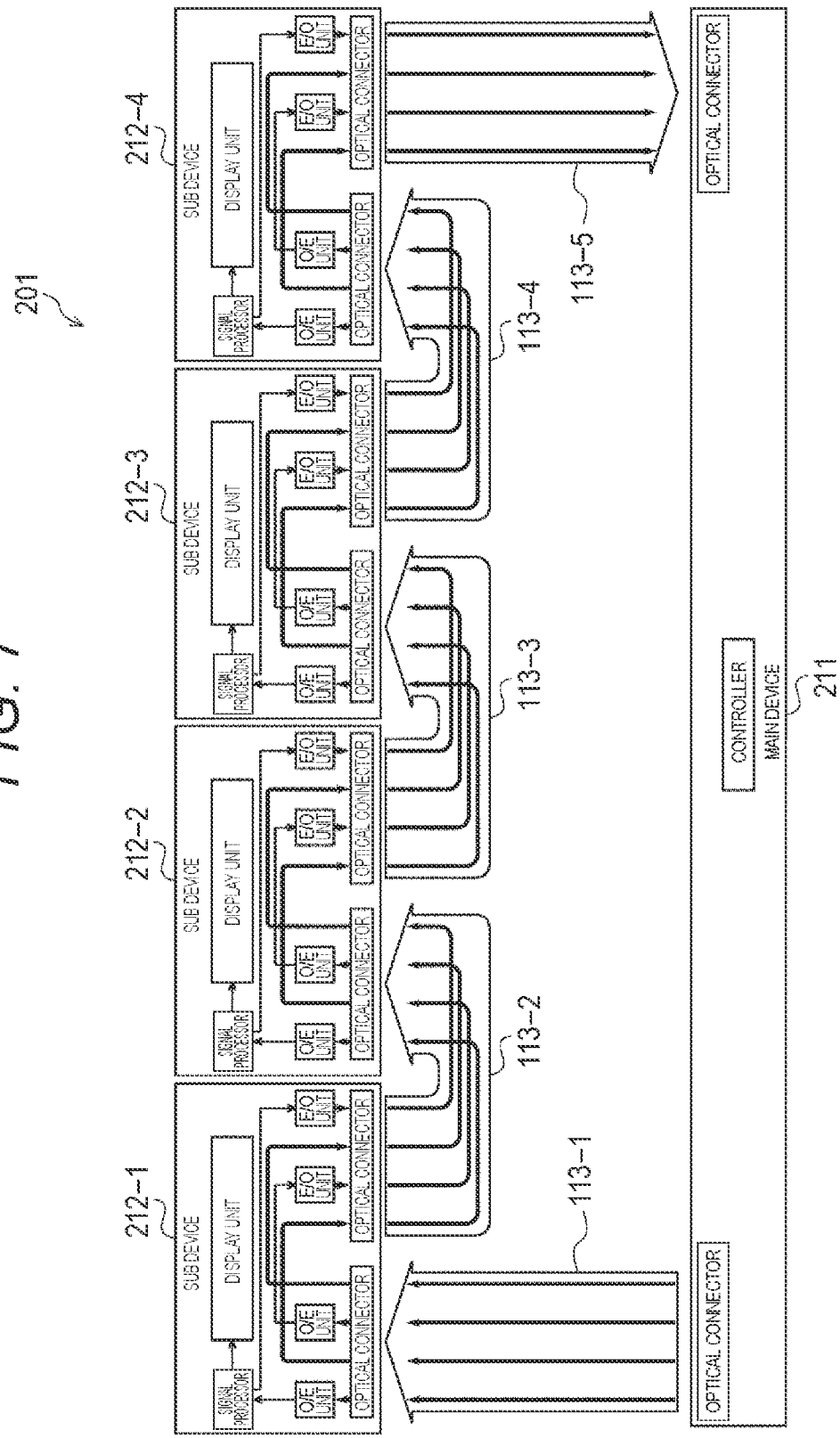
FIG. 7 is a diagram illustrating a second embodiment of the transmission system to which the present technology is applied.

FIG. 7 illustrates a configuration example of a transmission system 201 corresponding to the second embodiment of the, transmission system to which the present technology is applied. Note that, in the drawing, portions corresponding to the portions of the transmission system 101 illustrated in FIG. 4 will be denoted by the same reference numerals, and no description will be given of such portions as appropriate.

The transmission system 201 includes a main device 211 and sub devices 212-1 to 212-4. The main device 211 and the sub devices 212-1 to 212-4 are daisy-chained in a closed loop.

Specifically, the main device 211 and the sub device 212-1 are connected over an optical cable 113. The sub device 212-1 and the sub device 212-2 are connected over an optical cable 113-2. The sub device 212-2 and the sub device 212-3 are connected over an optical cable 113-3. The sub device 212-3 and the sub device 212-4 are connected over an optical cable 113-4. The sub device 212-4 and the main device 211 are connected over an optical cable 113-5.

Note that, in a case where it is not necessary to identify the sub devices 212-1 to 212-4, the sub devices 212-1 to 212-4 are each hereinafter simply referred to as a sub device 212.

Figure 8:
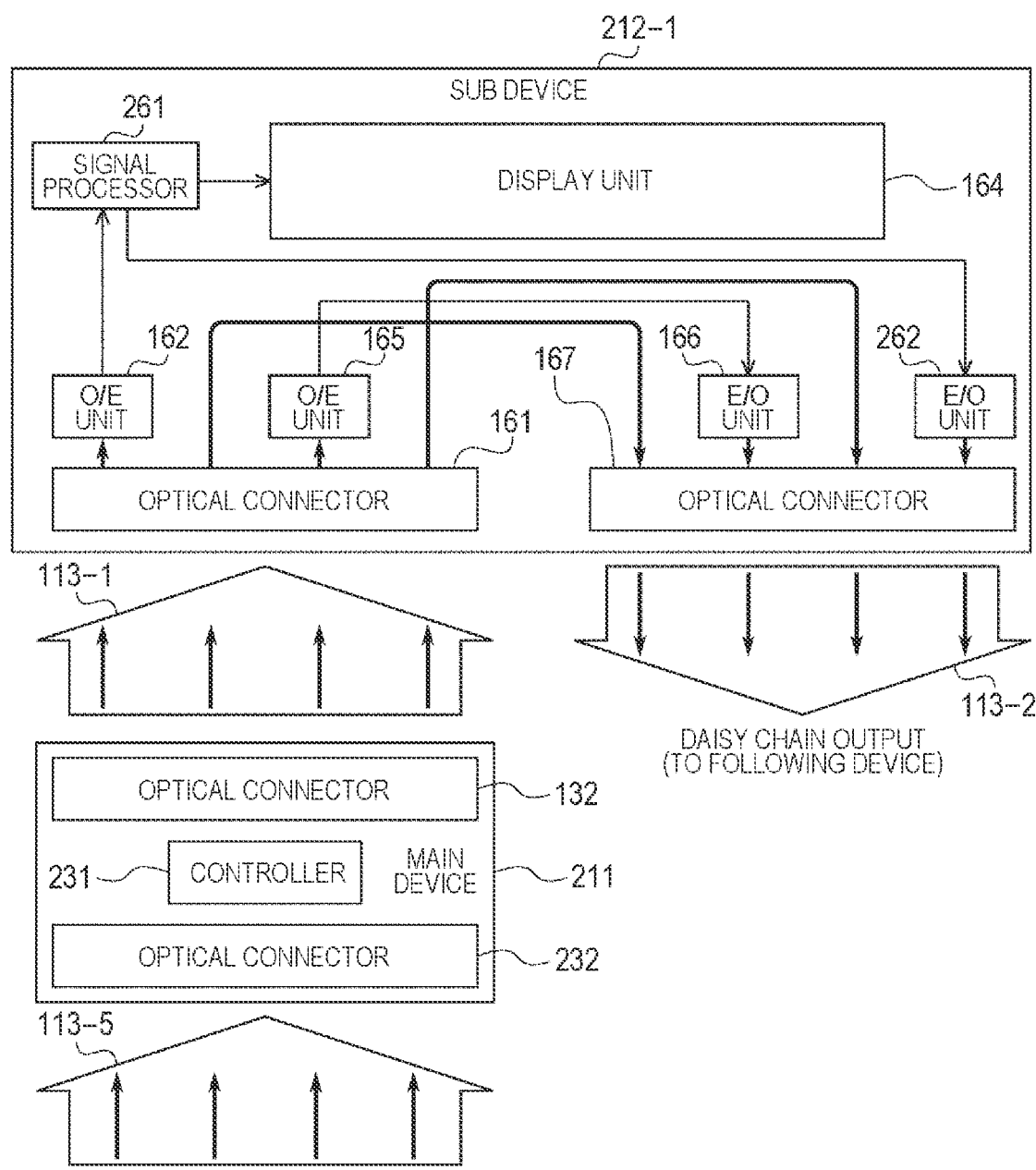
FIG. 8 is an enlarged view of a main device and a sub device illustrated in FIG. 7.

FIG. 8 is an enlarged view of the main device 211 and the sub device 212-1 illustrated in FIG. 7. Note that, in the drawing, portions corresponding to the portions of the main device 111 and the sub device 112-1 illustrated in FIG. 5 will be denoted by the same reference numerals, and no description will be given of such portions as appropriate.

The main device 211 is identical to the main device 111 in that both the main devices include the optical connector 132, and is different from The main device 111 in that the main device 211 includes a controller 231 instead of the controller 131 and further includes an optical connector 232.

The controller 231 generates, as with the controller 131 of the main device 111, image signals of channels 1 to 4, and generates optical signals of the channels 1 to 4 each containing the image signal of a corresponding channel. The controller 231 supplies the optical signals of the channels 1 to 4 to the optical connector 132.

Furthermore, as will be described later, the controller 231 controls a transmission signal on the basis of feedback information contained in a control signal supplied from each sub device 212.

The optical connector 132 is connected to the first sub device 212-1 over the optical cable 113-1 and outputs the optical signals of the channels 1 to 4 to the sub device 212-1.

The optical connector 232 is an input unit capable of receiving optical signals of four channels. The optical connector 232 is connected to the last sub device 212-4 over the optical cable 113-5 and receives the optical signals of the channels 1 to 4.

The sub device 212-1 is identical to the sub device 112-1 illustrated in FIG. 5 in that both the sub devices include the optical connector 161, the O/E unit 162, the display unit 164, the E/O unit 166, and the optical connector 167. On the other hand, the sub device 212-1 is different from the sub device 112-1 in that the sub device 212-1 includes a signal processor 261 instead of the signal processor 163 and further includes an E/O unit 262.

The signal processor 261 performs, as with the signal processor 163 of the sub device 112, predetermined processing on the electrical signal of the channel 1 and supplies the image signal of the channel 1 thus obtained to the display unit 164.

Furthermore, the signal processor 261 detects a state of the optical signal and the electrical signal of the channel 1 (the image signal of the channel 1) to be used and generates feedback information indicating a result of the detection. Specifically, for example, the signal processor 261 generates feedback information indicating a result of detection of intensity of the optical signal and the electrical signal of the channel 1 and an accurate delay time generated in the O/E unit 165 and the E/O unit 166 of the channel 3. The signal processor 261 generates an electrical signal containing a control signal that contains the feedback information and supplies the electrical signal thus generated to the E/O unit 262.

The E/O unit 262 converts the electrical signal containing the control signal into an optical signal and supplies the optical signal containing the control signal to the channel 4 of the optical connector 167.

The optical connector 167 is connected to the following sub device 212-2 over the optical cable 113-2 and outputs the optical signals of the channels 1 to 4.

Note that, although no detailed description will be given, the sub device 212-2 to the sub device 212-4 are similar in configuration to the sub device 212-1 and perform processing similar to the processing performed by the sub device 212-1.

FIG. 9 illustrates, as with FIG. 6, details of the signals that are transmitted between the devices of the transmission system 201. Note that, in FIG. 9, main denotes the main device 211, and subs #1 to #4 denote the sub devices 212-1 to 212-4, respectively. Image signals #1 to #4 denote the image signals of the channels 1 to 4, respectively. Control signals #1 to #4 denote the control signals of the sub devices 212-1 to 212-4, respectively.

Furthermore, a channel represented by a bold frame and bold letters denotes a channel used for image display by each sub device 212 of a transmission destination. A hatched channel denotes a channel of which the optical signal is subjected to compensation by each sub device 212 of the transmission destination.

A comparison between FIGS. 9 and 6 shows that there is a difference that, in each sub device 212, the optical signal containing the control signal of the sub device 212 is added to a channel that becomes unoccupied as a result of shifting the channels by the number of channels used by the sub device 212 and supplied. Furthermore, there is a difference in that a signal is transmitted from the sub device 212-4 to the main device Specifically, the sub devices 212-1 to 212-4 display images based on the image signals of the channels 1 to 4, respectively.

Furthermore, each sub device 212 performs compensation on the optical signal of the channel 3. Note that not only the optical signal containing the image signal but also the optical signal containing the control signal is to be subjected to compensation.

Moreover, each sub device 212 outputs, to the following device, the optical signals received from the preceding device other than the optical signal used) by the sub device 212. At this time, each sub device 12 shifts the channels of the optical signals to be output by the number of channels that become unoccupied as a result of excluding the optical signal used by the sub device 212. Furthermore, each sub device 212 adds the optical signal containing the control signal of the sub device 212 to the unoccupied channel (the last channel 4) and outputs the optical signal to the following device.

Specifically, the sub device 212-1 shifts the optical signals each containing' a corresponding one of the image signals of the channels 2 to 4 to the channels 1 to 3 and outputs the optical signals to the sub device 212-2. Furthermore, the sub device 212-1 adds the optical signal containing the control signal of the sub device 212-1 to the, channel 4 and outputs the optical signal to the sub device 212-2.

The sub device 212-2 shifts the optical signals each containing a corresponding one of the image signals of the channels 3 and 4 and the optical signal containing the control signal from the sub device 212-1 preceding the sub device 212-2 to the channels 1 to 3 and outputs the optical signals to the sub device 212-3. Furthermore, the sub device 212-2 adds the optical signal containing the control signal of the sub device 212-2 to the channel 4 and outputs the optical signal to the sub device 212-3.

The sub device 212-3 shifts the optical signal containing the image signal of the channel 4 and the optical signals containing the control signals from the sub device 212-1 preceding the sub device 212 and from the sub device 212-2 to the channels 1 to 3 and outputs the optical signals to the sub device 212-4. Furthermore, the sub device 212-3 adds the optical signal containing the control signal of the sub device 212-3 to the channel 4 and outputs the optical signal to the sub device 212-4.

The sub device 212-4 shifts the optical signals each containing a corresponding one of the control signals from the sub devices 212-1 to 212-3 preceding the sub device 212-4 to the channels 1 to 3 and outputs the optical signals to the main device 211. Furthermore, the sub device 212-4 adds the optical signal containing the control signal of the sub device 212-4 to the channel 4 and outputs the optical signal to the main device 211.

As described above, the main device 211 can acquire the feedback information of each sub device 212. Then, the controller 231 of the main device 211 controls the transmission signal on the basis of the feedback information of each sub device 212, for example.

For example, the controller 231 detects, on the basis of the feedback information from each sub device 212, the delay time of the image signal used by each sub device 212.

For example, as described above, the compensation processing is performed on the optical signal containing the image signal of the channel 3 and the optical signal containing the image signal of the channel 4, so that a transmission delay occurs. Hereinafter, a case where the delay time of the image signal of the channel 3 is denoted as t3, the delay time of the image signal of the channel 4 is denoted as t4, and the delay time t3>the delay time t4 is satisfied will be described.

For example, the controller 231 controls the timing with which the optical signal of each channel is output on the basis of the delay time of the image signal used by each sub device 212.

Specifically, the controller 231 causes the optical connector 132 to output the optical signal of the channel 3 containing the image signal of the channel 3 that suffers the longest delay without performing time compensation. Next, the controller 231 causes, upon lapse of a delay time t3-t4 from the output of the optical signal of the channel 3, the optical connector 132 to output the optical signal of the channel 4 containing the image signal of the channel 4 that suffers the second longest delay. Next, the controller 231 causes, upon lapse of the delay time t3 from the output of the optical signal of the channel 3, the optical connector 132 to output the optical signal of the channel 1 containing the image signal of the channel 1 and the optical signal of the channel 2 containing the image signal of the channel 2, both the image signal of the channel 1 and the image signal of the channel 2 suffering no transmission delay.

This makes timing with which the image signals of the channels 1 to 4 each reach a corresponding one of the sub devices 212 that use the image signals synchronous. Then, the image of each channel is displayed in synchronization with higher accuracy.

Note that, for example, the controller 231 may control, on the basis of the delay time of the image signal used by each sub device 212, timing with which the signal processor 261 of each sub device 212 processes the image signal of each channel.

For example, the controller 231 adds delay time control information indicating the delay time t3 to the image signals of the channels 1 and 2, adds delay, time control information indicating a delay time of zero to the image signal of the channel 3, and adds delay time control information indicating the delay time t3-t4 to the image signal of the channel 4.

On the other hand, the signal processor 261 of each sub device 212 controls, on the basis of the delay time control information, the timing with which the image is displayed.

For example, the signal processor 261 of the sub device 212-1 delays timing with which the image based on the image signal of the channel 1 is output to and. displayed on the display unit 164 by the delay time t3. The signal processor 261 of the sub device 212-2 delays timing with which the image based on the image signal of the channel 2 is output to and displayed on the display unit 164 by the delay time t3. The signal processor 261 of the sub device 212-3 does not delay timing with which the image based on the image signal of the channel 3 is output to and displayed on the display unit 164. The signal processor 261 of the sub device 212-4 delays timing with which the image based on the image signal of the channel 4 is output to and displayed on the display unit 164 by the delay time t3-t4.

As a result, the image of each channel is displayed in synchronization with higher accuracy.

Furthermore, the controller 231 detects the intensity of (the optical signal and the electrical signal containing) the image signal used by each sub device 212 on the basis of the feedback information from each sub device 212. Then, the controller 231 controls the intensity of the optical signal of each channel on the basis of the intensity of the image signal used by each sub device 212.

For example, in a case where the intensity of the image signal of the channel 1 is low, the image signal being not subjected to compensation processing in any sub device 212, the controller 231 adjusts output intensity of the optical signal of the channel 1 so as to make the intensity of the image signal of the channel 1 higher than or equal to a predetermined level. Similarly, in a case where the intensity of the image signal of the channel 2 is low, the image signal being not subjected to compensation processing in any sub device 212, the controller 231 adjusts output intensity of the optical signal of the channel 2 so as to make the intensity of the image signal of the channel 2 higher than or equal to the predetermined level.

Furthermore, in a case where the image signal of the channel 3 is low in intensity, the image signal being subjected to compensation processing in the sub device 212-1, the controller 231 instructs the E/O unit 166 of the sub device 212-1 to increase the intensity of the optical signal to be output. That is, the controller 231 instructs the E/O unit 166 of the sub device 212-1 so as to make the intensity of the optical signal converted from the electrical signal containing the image signal of the channel 3 (after being subjected to compensation) higher than or equal to the predetermined level.

In a case where the electrical signal containing the image signal of the channel 3 is converted into the optical signal, the E/O unit 166 of the sub device 212-1 performs, in response to the instruction, control so as to make the intensity of the optical signal after conversion higher than or equal to the predetermined level.

Similarly, in a case where the intensity of the image signal of the channel 4 is low, the image signal being subjected to compensation processing in the sub device 212-2, the controller 231 instructs the E/O unit 166 of the sub device 212-2 to increase The intensity of the optical signal to be output. That is, the controller 231 instructs the E/O unit 166 of the sub device 212-2 so as to make the intensity of the optical signal converted from the electrical signal containing the image signal of the channel 4 (after being subjected to compensation) higher than or equal to the predetermined level.

In a case where the electrical signal containing the image signal of The channel 4 is converted into the optical signal, the E/O unit 166 of the sub device 212-2 performs, in response to the instruction, control so as to make the intensity of the optical signal after conversion higher than or equal to the predetermined level.

As a result, the intensity of the optical signal of each channel becomes appropriate, which makes high-quality signal transmission possible.

4. Third Embodiment

Next, a third embodiment of the present technology will be described with reference to FIGS. 10 to 12.

Figure 10:
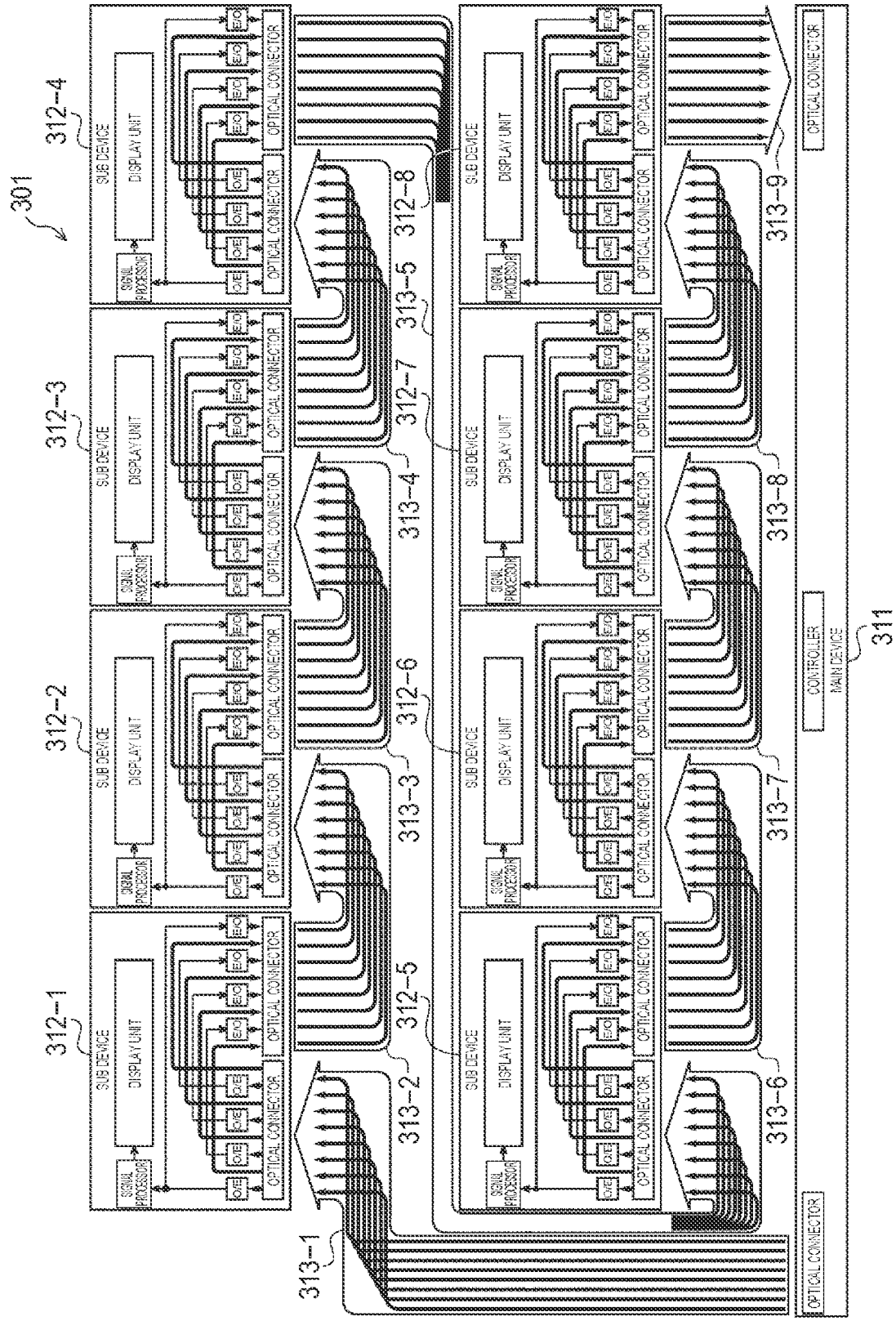
FIG. 10 is a diagram illustrating a third embodiment of the transmission system to which the present technology is applied.

FIG. 10 illustrates a configuration example of a transmission system 301 corresponding to the third embodiment of the transmission system to which the present technology is applied.

The transmission system 301 is largely different from the transmission system 201 illustrated in FIG. 7 in that the number of sub devices is increased from four to eight.

The transmission system 301 includes a main device 311 and sub devices 312-1 to 312-8. The main device 311 and the sub devices 312-1 to 312-8 are daisy-chained in a closed loop.

Specifically, the main device 311 and the sub device 312-1 are connected over an optical cable 313-1.

The sub device 312-1 and the sub device 312-2 are connected over an optical cable 313-2. The sub device 312-2 and the sub device 312-3 are connected over an optical cable 313-3. The sub device 312-3 and the sub device 312-4 are connected over an optical cable 313-4.

The sub device 312-4 and the sub device 312-5 are connected over an optical cable 313-5. The sub device 312-5 and the sub device 312-6 are connected over an optical cable 313-6. The sub device 312-6 and the sub device 312-7 are connected over an optical cable 313-7. The sub device 312-7 and the sub device 312-8 are connected over an optical cable 313-8. The sub device 312-8 and the main device 311 are connected over an optical cable 313-9.

Note that, in a case where it is not necessary to identify the sub devices 312-1 to 312-8, the sub devices 312-1 to 312-8 are each hereinafter simply, referred to as a sub device 312.

Figure 11:
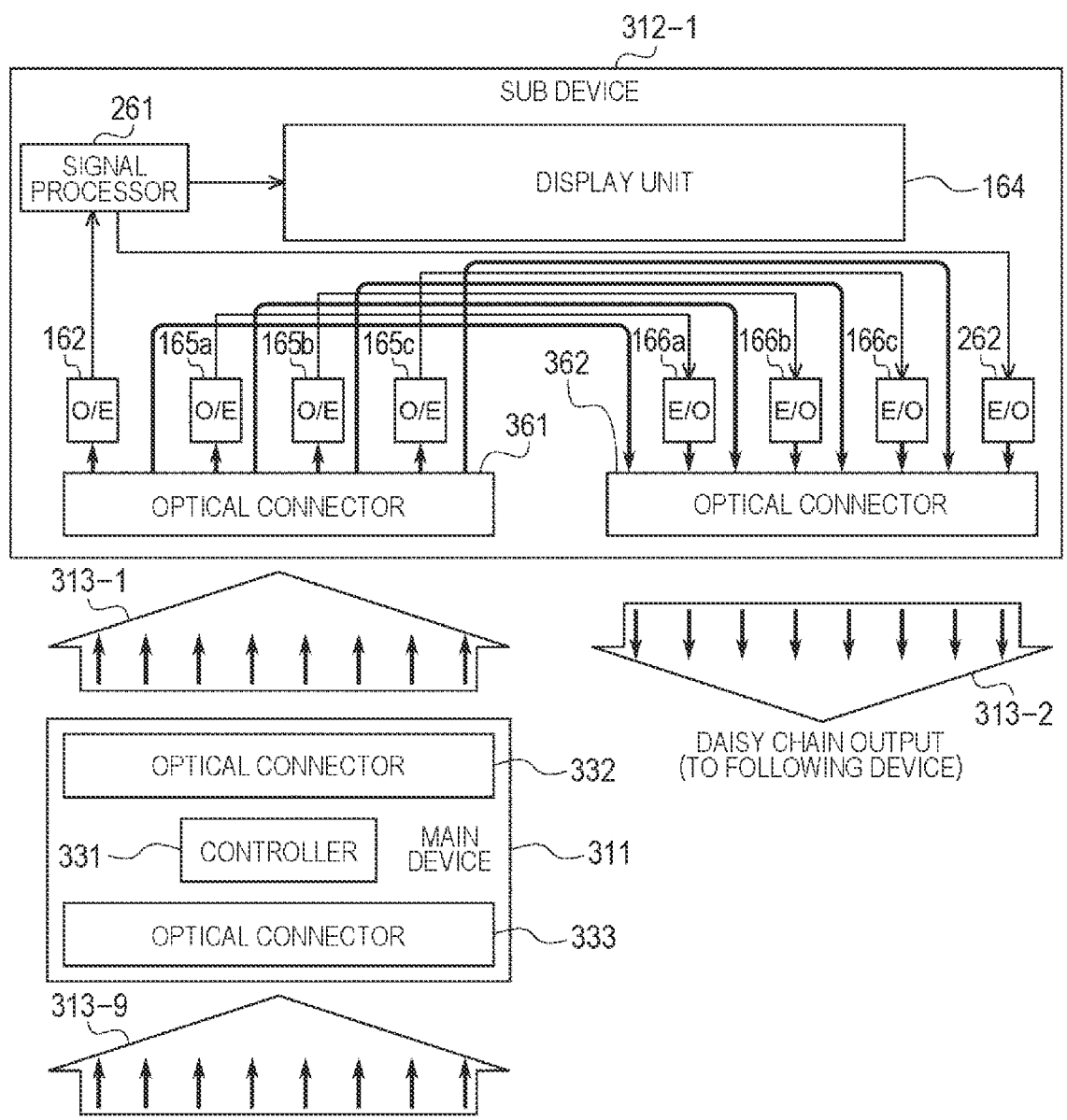
FIG. 11 is an enlarged view of a main device and a sub device illustrated in FIG. 10.

FIG. 11 is an enlarged view of the main device 311 and the sub device 312-1 illustrated in FIG. 10. Note that, in the drawing, portions corresponding to the portions of the sub device 312-1 illustrated in FIG. 8 will be denoted by the same reference numerals, and no description will be given of such portions as appropriate.

The main device 311 includes a controller 3311 an optical connector 332, and an optical connector 333.

As with the controller 231 of the main device 211 illustrated in FIG. 8, the controller 331 generates image signals of channels 1 to 8 and generates optical signals of the channels 1 to 8 each containing the image signal of a corresponding channel. The controller 331 supplies the optical signals of the channels 1 to 8 to the optical connector 332.

Furthermore, the controller 331 controls, as with the controller 231 of the main device 211, a transmission signal on the basis of feedback information contained in a control signal supplied from each sub device 312.

The optical connector 332 is an output unit capable of outputting optical signals of eight channels. The optical connector 332 is connected to the first sub device 312-1 over the optical cable 313-1 and outputs the optical signals of the channels 1 to 8 to the sub device 312-1.

The optical connector 333 is an input unit capable of receiving optical signals of eight channels. The optical connector 333 is connected to the last sub device 312-8 over the optical cable 313-9 and receives the optical signals of the channels 1 to 8.

The sub device 312-1 is identical to the sub device 212-1 illustrated in FIG. 8 in that both the sub devices include the O/E unit 162, the display unit 164, the signal processor 261, and the E/O unit 262. On the other hand, the sub device 312-1 is different from the sub device 212-1 in that the sub device 312-1 includes three O/E units, O/E units 165a to 165c, as the O/E unit 165, three E/O units, E/O units 166a to 166c, as the E/O unit. 166, and an optical connector 361 and an optical connector 362 instead of the optical connector 161 and the optical connector 167.

Note that, in a case where it is not necessary to identify the O/E units 165a to 165c, the O/N units 165a to 165c are each hereinafter simply referred to as an O/E unit 165. In a case where it is not necessary to identify the E/O units 166a to 166c , the N/O units 166a to 166c are each hereinafter simply referred to as an E/O unit 166.

The optical connector 361 is an input unit capable of receiving optical signals of eight channels. The optical connector 361 is connected to the main device 311 over the optical cable 313-1 and receives the optical signals of the channels 1 to 8 from the main device 311. The optical connector 361 supplies the optical signal of the channel 1 to the O/N unit 162. The optical connector 361 supplies the optical signals of the channels 3, 5, and 7 to the O/E units 165a to 165c , respectively. The optical connector 361 shifts the optical signals of the channels 2, 4, 6, and 8 to a higher order by one channel and supplies the optical signals to the channels 1, 3, 5, and 7 of the optical connector 362, respectively.

The O/N units 165a to 165c are arranged to correspond to channels obtained as a result of thinning out, at predetermined intervals, the channels 2 to 8 other than the channel 1 used by the signal processor 261. Specifically, the O/N units 165a to 165c are arranged every other channel, that is, the channels 3, 5, and 7. The O/E units 165a to 165c convert the optical signals of the channels 3, 5, and 7 into electrical signals, respectively, and supply the electrical signals to the E/O units 166a to 166c, respectively.

The E/O units 166a to 166c are arranged to correspond to the same channels as the O/E units 165a to 165c , respectively. The E/O units 166a to 166c convert the electrical signals of the channels 3, 5, and 7 into optical signals, respectively, shift the optical signals to a higher order by one channel, and supply the optical signals to the channels 2, 4, and 6 of the optical connector 362, respectively.

The E/O unit 262 converts the electrical signal containing the control signal supplied from the signal processor 261 into an optical signal and supplies the optical signal to the channel 8 of the optical connector 362.

The optical connector 362 is an output unit capable of outputting optical signals of eight channels. The optical connector 362 is connected to the sub device 312-2 over the optical cable 313-2 and outputs the optical signals of the channels 1 to 8 to the sub device 312-2.

Note that, although no detailed description will be given, the sub devices 312-2 to 312-8 are similar in configuration to the sub device 312-1 and perform processing similar to the processing performed by the sub device 312-1.

FIG. 12 illustrates, as with FIGS. 6 and 9, details of the signals that are transmitted between the devices of the transmission system 301. Note that, in FIG. 12, main denotes the main device 311, and subs #1 to #8 denote the sub devices 312-1 to 312-8, respectively. Image signals #1 to #8 denote the image signals of the channels 1 to 8, respectively. Control signals #1 to #8 denote the control signals of the sub devices 312-1 to 312-8, respectively.

Furthermore, a channel represented by a bold frame and bold letters denotes a channel used for image display by each sub device 312 of a transmission destination. A hatched channel denotes a channel of which the optical signal is subjected to compensation by each sub device 312 of the transmission destination.

FIG. 12 is largely different from FIG. 9 in that the number of sub devices 312 is increased, the number of channels is increased, and the number of channels subjected to compensation in each sub device 312 is increased.

The sub devices 312-1 to 312-8 output images based on the image signals of the channels 1 to 8, respectively.

Furthermore, each sub device 312 performs compensation on the optical signals of the channels 3, 5, and 7. Note that not only the optical signal containing the image signal but also the optical signal containing the control signal is to be subjected to compensation.

Moreover, each sub device 312 outputs, to the following device, the optical signals received from the preceding device other than the optical signal of the channel used by the sub device 312. At this time, each sub device 312 shifts the channels of the optical signals to be output by the number of channels that become unoccupied as a result of excluding the optical signal used by the sub device 312. Furthermore, each sub device 312 adds the optical signal containing the control signal of the sub device 312 to the unoccupied channel (the last channel 8) and outputs the optical signal to the following device.

Here, the number of times of compensation on and the number of loss occurrences in the image signal of each channel an the transmission system 301 will be described.

Note that the number of times of compensation on the image signal of each channel is equal to the number of compensation units (a combination of the O/E unit 165 and the E/O unit 166) through which (the optical signal and the electrical signal containing) the image signal of each channel output from the controller 331 of the main device 311 passes to reach the signal processor 261 of the sub device 312 that uses the image signal. Furthermore, the number of loss occurrences in the image signal of each channel is equal to the number of optical connectors through which (the optical signal containing) the image signal of each channel output from the controller 331 of the main device 311 or subjected to compensation by each sub device 312 passes to reach the signal processor 261 of the sub device 312 that uses the image signal.

The image signal of the channel 1 is used by the signal processor 261 of the sub device 312-1. Then, the image signal of the channel 1 output from the controller 331 of the main device 311 reaches the signal processor 261 of the sub device 312-1 without passing through the compensation unit of any sub device 312. Therefore, the number of times of compensation on the image signal of the channel 1 is zero.

Furthermore, the image signal of the channel 1 output from the controller 331 of the main device 311 passes through two optical connectors, the optical connector 332 of the main device 311 and the optical connector 361 of the sub device 312-1, to reach the signal processor 261 of the sub device 312-1. Therefore, the number of loss occurrences in the image signal of the channel 1 is two, The image signal of the channel 2 is used by the signal processor 261 of the sub device 312-2. Then, the image signal of the channel 2 output from the controller 331 of the main device 311 reaches the signal processor 261 of the sub device 312-2 without passing through the compensation unit of any sub device 312. Therefore, the number of times of compensation on the image signal of the channel 2 is zero.

Furthermore, the image signal of the channel 2 output from the controller 331 of the main device 311 passes through four optical connectors, the optical connector 332 of the main device 311, the optical connector 361 and the optical connector 362 of the sub device 312-1, the optical connector 361 of the sub device 312-2, to reach the signal processor 261 of the sub device 312-2. Therefore, the number of loss occurrences in the image signal of the channel 2 is four.

The image signal of the channel 3 is used by the signal processor 261 of the sub device 312-3. Then, the image signal of the channel 3 output from the controller 331 of the main device 311 passes through the compensation unit of the sub device 312-1 to reach the signal processor 261 of the sub device 312-3. Therefore, the number of times of compensation on the image signal of the channel 3 is one.

Furthermore, the image signal of the channel 3 subjected to compensation by the compensation unit of the sub device 312-1 passes through four optical connectors, the optical connector 362 of the sub device 312-1, the optical connector 361 and the optical connector 362 of the sub device 312-2, and the optical connector 361 of the sub device 312-3, to reach the signal processor 261 of the sub device 312-3. Therefore, the number of loss occurrences in the image signal of the channel 3 is four.

The image signal of the channel 4 is used by the signal processor 261 of the sub device 312-4. Then, the image signal of the channel 4 output from the controller 331 of the main device 311 passes through the compensation unit of the sub device 312-2 to reach the signal processor 261 of the sub device 312-4. Therefore, the number of times of compensation on the image signal of the channel 4 is one.

Furthermore, the image signal of the channel 4 subjected to compensation by the compensation unit of the sub device 312-2 passes through four optical connectors, the optical connector 362 of the sub device 312-2, the optical connector 361 and the optical connector 362 of the sub device 312-3, and the optical connector 361 of the sub device 312-4, to reach the signal processor 261 of the sub device 312-4. Therefore, the number of loss occurrences in the image signal of the channel 4 is four.

The image signal of the channel 5 is used by the signal processor 261 of the sub device 312-5. Then, the image signal of the channel 5 output from the controller 331 of the main device 311 passes through the compensation unit of the sub device 312-1 and the compensation unit of the sub device 312-3 to reach the signal processor 261 of the sub device 312-5. Therefore, the number of times of compensation on the image signal of the channel 5 is two.

Furthermore, the image signal of the channel 5 subjected to compensation by the compensation unit of the sub device 312-3 passes through four optical connectors, the optical connector 362 of the sub device 312-3, the optical connector 361 and the optical connector 362 of the sub device 312-4, and the optical connector 361 of the sub device 312-5, to reach the signal processor 261 of the sub device 312-5. Therefore, the number of loss occurrences in the image signal of the channel 5 is four.

The image signal of the channel 6 is used by the signal processor 261 of the sub device 312-6. Then, the image signal of the channel 6 output from the controller 331 of the main device 311 passes through the compensation unit of the sub device 312-2 and the compensation unit of the sub device 312-4 to reach the signal processor 261 of the sub device 312-6. Therefore, the number of times of compensation on the image signal of the channel 6 is two.

Furthermore, the image signal of the channel 6 subjected to compensation by the compensation unit of the sub device 312-4 passes through four optical connectors, the optical connector 362 of the sub device 312-4, the optical connector 361 and the optical connector 362 of the sub device 312-5, and the optical connector 361 of the sub device 312-6, to reach the signal processor 261 of the sub device 312-6. Therefore, the number of loss occurrences in the image signal of the channel 6 is four.

The image signal of the channel 7 is used by the signal processor 261 of the sub device 312-7. Then, the image signal of the channel 7 output from the controller 331 of the main device 311 passes through the compensation unit of the sub device 312-1, the compensation unit of the sub device 312-3, and the compensation unit of the sub device 312-5 to reach the signal processor 261 of the sub device 312-7. Therefore, the number of times of compensation on the image signal of the channel 7 is three.

Furthermore, the image signal of the channel 7 subjected to compensation by the compensation unit of the sub device 312-5 passes through four optical connectors, the optical connector 362 of the sub device 312-5, the optical connector 361 and the optical connector 362 of the sub device 312-6, and the optical connector 361 of the sub device 312-7, to reach the signal processor 261 of the sub device 312-7. Therefore, the number of loss occurrences in the image signal of the channel 7 is four.

The image signal of channel 8 is used by the signal processor 261 of the sub device 312-8. Then, the image signal of the channel 8 output from the controller 331 of the main device 311 passes through the compensation unit of the sub device 312-2, the compensation unit of the sub device 312-4, and the compensation unit of the sub device 312-6 to reach the signal processor 261 of the sub device 312-8. Therefore, the number of times of compensation on the image signal of the channel 8 is three Furthermore, the image signal of the channel 8 subjected to compensation by the compensation unit of the sub device 312-6 passes through four optical connectors, the optical connector 362 of the sub device 312-6, the optical connector 361 and the optical connector 362 of the sub device 312-7, and the optical connector 361 of the sub device 312-8, to reach the signal processor 261 of the sub device 312-8. Therefore, the number of loss occurrences in the image signal of the channel 8 is four.

As described above, even if the number of the sub devices 312 is increased, and the O/E units 165 and the E/O units 166 are provided for not all the channels but some of the channels, it is possible to reduce a loss in the image signal (optical signal) caused as the image signal passes through the optical connector and guarantee the communication quality regardless of the connection. order of each sub device 312. Specifically, the loss in the image signal of each channel is controlled to be less than or equal to a loss caused as the image signal passes through up to four optical connectors.

Furthermore, the number of times of compensation on the image signal of each channel can be controlled up to three times, and the delay in transmission of the optical signal can be reduced.

5. Modification

Hereinafter, modifications of the above-described embodiments of the present technology will be described.

For example, in the present technology, the number of sub devices to be connected in a daisy chain can be set to any number greater than or equal to three. Note that the number of channels of optical signals output from the main device is set greater than or equal to the number of sub devices.

For example, an example where the compensation. units each including the O/E unit and the E/O unit are arranged every other channel has been described above, but the compensation units may be arranged at predetermined intervals of two or more channels.

For example, each sub device may use signals of n channels where n is greater than or equal to two. In this case, for example, each sub device shifts optical signals received from the preceding device other than optical signals used by the sub device by the number of the n channels of the optical signals used by the sub device and output the optical signals to the following device.

For example, the present technology is further applicable to a case where a signal that is different in form from an optical signal is transmitted on a daisy chain topology. For example, the present technology is further applicable to a case where an electrical signal is transmitted on a daisy chain topology. In this case, a compensation unit that performs compensation on the electrical signal in each sub device includes, for example, a combination of a digital/analog (D/A) converter and an analog/digital (A/D) converter, or an amplifier.

For example, not only the sub device but also the main device may perform signal processing in a similar manner to the sub device. For example, in the above-described embodiments, the main device may also perform processing of displaying an image.

For example, the content of the information contained in the control signal output from each sub device can be changed as needed. For example, the control signal may contain only either one of the delay time and the intensity of the image signal used by each sub device. Furthermore, for example, the control signal may contain information other than the above-described feedback information. Moreover, for example, each sub device may use information contained in the control signal output from the preceding sub device. In this case, when the main device does not use the information contained in the control signal of each sub device (when it is not necessary to feed the information back from each sub device to the main device), it is not necessarily essential to connect the last sub device and the main device.

For example, the present technology is applicable to not only the above-described multi-monitor system but also a system in which sub devices that are connected in a daisy chain each use a signal of a different channel.

6. Others

<Configuration Example of Computer>

The above-described series of processing can be performed by hardware or software. In a case where the series of processing is performed by software, a program constituting the software is installed on a computer. Here, examples of the computer include a computer incorporated into dedicated hardware, a general-purpose personal computer capable of performing various functions in accordance with various programs installed on the general-purpose personal computer, and the like.

Figure 13:
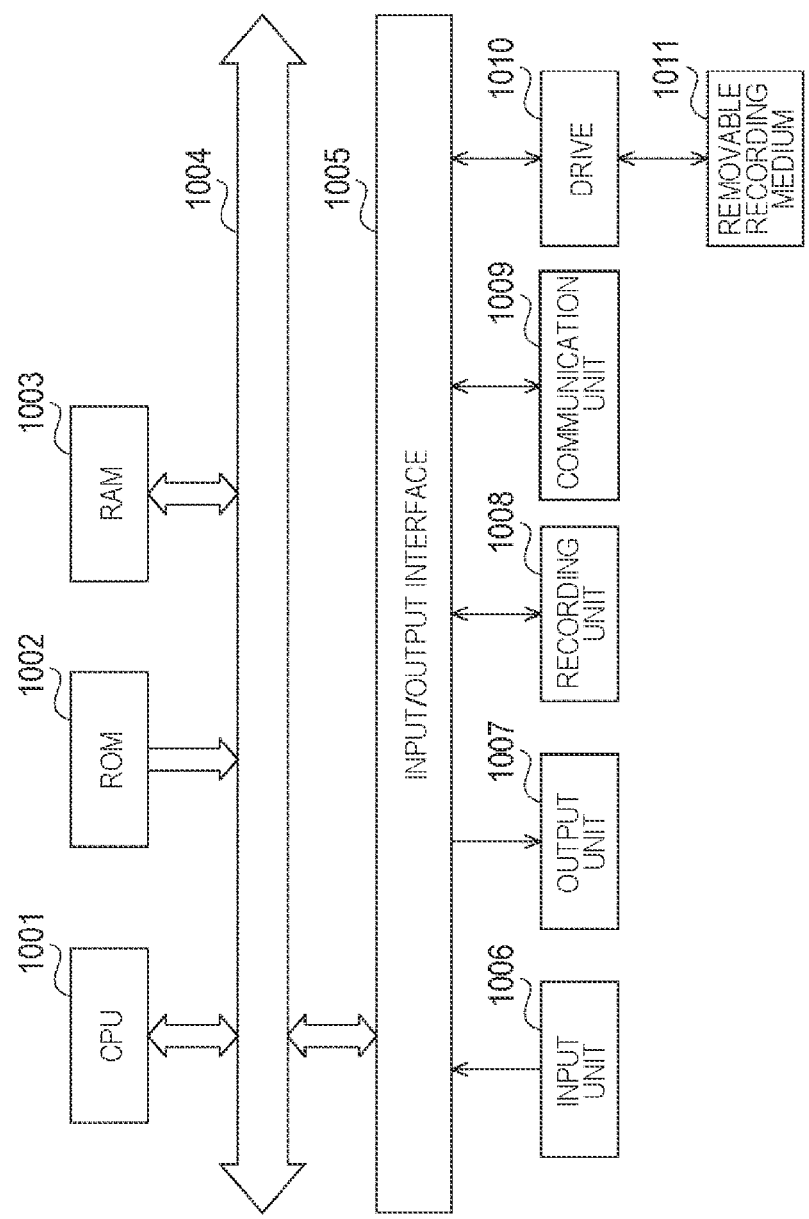
FIG. 13 is a block diagram illustrating a configuration example of a computer.

FIG. 13 is a block diagram illustrating a configuration example of hardware of a computer that performs the above-described series of processing in accordance with a program.

In a computer 1000, a central processing unit (CPU) 1001, a read only memory. (ROM) 1002, and a random access memory (RAM) 1003 are mutually connected over a bus 1004.

An input/output interface 1005 is further connected to the bus 1004. An input unit 1006, an output unit 1007, a recording unit 1008, a communication unit 1009, and a drive 1010 are connected to the input/output interface 1005.

The input unit 1006 includes an input switch, a button, a microphone, an imaging element, or the like.

The output unit 1007 includes a display, a speaker, or the like. The recording unit 1008 includes a hard disk, a non-volatile memory, or the like. The communication unit 1009 includes a network interface or the like. The drive 1010 drives a removable medium 1011 such as a magnetic disk, an optical disc, a magneto optical disk, or a semiconductor memory.

In the computer 1000 configured as described above, for example, the CPU 1001 performs the above-described series of processing by loading a program recorded in the recording unit 1008 onto the RAM 1003 via the input/output interface 1005 and the bus 1004 and running the program.

The program run by the computer 1000 (CPU 1001) can be provided with the program recorded in the removable medium 1011 that serves as a package medium or the like, for example. Furthermore, this program can be provided via a wired or wireless transmission medium such as a local area network, the Internet, or digital satellite broadcasting.

In the computer 1000, attaching the removable medium 1011 to the drive 1010 allows the program to be installed on the recording unit 1008 via the input/output interface 1005. Furthermore, the program can be received by the communication unit 1.009 via a wired or wireless transmission medium and installed on the recording unit 1008. Alternatively, this program can be preinstalled on the RUM 1002 or the recording unit 1008.

Note that the program to be run by the computer may be a program in which processing is performed in time-series order described herein, or may be a program in which processing is performed an parallel or at a required timing such as when the processing is called.

Furthermore, herein, a system means a set of a plurality of components (devices, modules (parts), etc.), regardless of whether or not all the components are in the same housing. Therefore, a plurality of devices housed in separate housings and connected over a network, and one device in which a plurality of modules is housed in one housing are both systems.

Moreover, the embodiments of the present technology are not limited to the above-described embodiments, and various modifications may be made without departing from the gist of the present technology.

<Example of Combination of Configurations>

The present technology may also have the following configurations.

(1) A transmission system including a plurality of sub devices and a main device that are connected in a daisy chain, in which
  the main device includes
    a first main connector connected to a first sub device of the plurality of sub devices, the first main connector being configured to output transmission signals or a plurality of channels, and
  each of the plurality of sub devices includes:
    a first sub connector connected to a preceding device, the first sub connector being configured to receive the transmission signals;
    a compensation unit disposed to correspond to a channel obtained as a result of thinning out, at predetermined channel intervals, channels other than a channel of an own device signal that is the transmission signal used by the sub device to which the compensation. unit belongs, the compensation unit being configured to perform compensation on the transmission signals; and
    a second sub connector configured to shift, in a case where the second sub connector is connected to a following device, channels of the transmission signals received from the preceding device other than the own device signal by the number of channels of the own device signal and output The transmission signals.

(2) The transmission system according to the above (1), in which
each of the plurality of sub devices further includes
a signal processor configured to process the own device signal.

(3) The transmission system according to the above (2), in which
the signal processor detects a connection order of the sub device to which the signal processor belongs on the basis of whether or not the transmission signal has been input to the compensation unit.

(4) The transmission system according to the above (3), in which
the signal processor controls timing with which the signal processor processes the own device signal on the basis of the connection order detected of the sub device to which signal processor belongs.

(5) The transmission system according to any one of the above to (4), in which
The first sub connector receives the transmission signals and a control signal from each of the plurality of sub devices preceding the sub device to which the first sub connector belongs, and
the second sub connector outputs the transmission signals received from the preceding device other than the own device signal, the control signal from each of the plurality of sub devices preceding the sub device to which the second sub connector belongs, and a control signal of the sub device to which the second sub connector belongs.

(6) The transmission system according to the above (5), in which
the signal processor generates a signal containing feedback information indicating a state of the own device signal as the control signal of the sub device to which the signal processor belongs.

(7) The transmission system according to the above (6), in which
the main device further includes:
a second main connector connected to the sub device that is a last sub device of the plurality of sub devices, the second main connector being configured to receive the control signal from each of the plurality of sub devices; and
a controller configured to control the transmission signals on the basis of the feedback information contained in the control signal from each of the plurality of sub devices.

(8) The transmission system according to the above (7), in which
the feedback information contains at least one of a delay time or intensity of the transmission signal used by each of the plurality of sub devices, (9) The transmission system according to the above (8), in which
the controller controls, on the basis of the delay time of the transmission signal used by each of the plurality of sub devices, timing with which the first main connector outputs the transmission signal of each channel.

(10) The transmission system according to the above (8) or (9), is which
the controller controls, on the basis of the delay time of the transmission signal used by each of the plurality of sub devices, timing with which the signal processor of each of the plurality of sub devices processes the transmission signal.

(11) The transmission system according to any one of the above (8) to (10), in which
the controller controls intensity of the transmission signal of each channel on the basis of the intensity of the transmission signal used by each of the plurality of sub devices.

(12) The transmission system according to the above (11), in which
the controller controls intensity of the transmission signal subjected to compensation is the compensation unit of each of the plurality of sub devices on the basis of the intensity of the transmission signal used by each of the plurality of sub devices.

(13) The transmission system according to anyone of the above (5) to (12), in which
the second sub connector outputs the transmission signals other than the transmission signals received from the preceding device and the control signal from each of the plurality of sub devices preceding the sub device to which the second sub connector belongs with channels shifted by the number of channels of the own device signal and outputs the control signal of the sub device to which the second sub connector belongs from a channel that becomes unoccupied as a result of shifting the channels.

(14) The transmission system according to any one of the above (2) to (13), in which
the transmission signal contains an image signal, and
the signal processor performs processing of displaying an image based on the image signal contained in the own device signal.

(15) The transmission system according to any one of the above (1) to (14), in which
the compensation unit includes:
a converter configured to convert a form of the transmission signal; and.
an inverse converter configured to inversely convert the form of the transmission signal converted by the converter.

(16) The transmission system according to the above (15), in which
the transmission signal is an optical signal,
the converter performs opto-electric conversion on the transmission signal, and.
the inverse converter performs electro-optic conversion on the transmission signal.

(17) The transmission system according to any one of the above (1) to (6) and. (13) to (16), in which
the second sub connector of the sub device that is a last sub device of the plurality of sub devices is not connected to a following device.

(18) A transmission method for a plurality of sub devices and a main device that are connected in a daisy chain, the transmission method including:
causing the main device to output transmission signals of a plurality of channels to the sub device that is a first sub device of the plurality of sub devices; and
causing each of the plurality of sub devices to perform compensation on the transmission signals obtained as a result of thinning out, at predetermined channel intervals, the transmission signals received from the preceding device other than an own device signal that is the transmission signal used by the sub device, shift, in a case where the sub device is connected to the following device, channels of the transmission signals received from the preceding device other than the own device signal by the number of channels of the own device signal, and output the transmission signals to the following device.

(19) A transmission device including:
a first connector connected to the preceding device, the first connector being configured to receive a transmission signal;
a compensation unit disposed to correspond to a channel obtained as a result of thinning out, at predetermined intervals, channels other than a channel of an own device signal that is the transmission signal used by a sub device to which the compensation unit belongs, the compensation unit being configured to perform compensation on the transmission signal; and
a second connector configured to shift, in a case where the second connector is connected to the following device, channels of the transmission signals received from the preceding device other than the own device signal by the number of channels of the own device signal and output the transmission signals.

(20) A transmission device including:
a first connector connected to a first sub device of a plurality of the sub devices connected in a daisy chain, the first connector being configured to output transmission signals of a plurality of channels;
a second connector connected to a last sub device of the plurality of sub devices, the second connector being configured to receive a control signal containing feedback information indicating a state of the transmission signal used by each of the plurality of sub devices and output from each of the plurality of sub devices; and
a controller configured to control the transmission signals on the basis of the feedback information contained in the control signal from each of the plurality of sub devices.

Note that the effects described herein are merely examples and should not be restrictively interpreted, and other effects may be provided.

REFERENCE SIGNS LIST

101 Transmission system
111 Main device
112-1 to 112-4 Sub device
131 Controller
132 Optical connector
161 Optical connector
162 Opto-electric converter
163 Signal processor
164 Display unit
165, 165a to 165c Opto-electric converter
166, 166a to 166c Electro-optic converter
167 Optical connector
201 Transmission system
211 Main device
212-1 to 212-4 Sub device
231 Controller
232 Optical connector
261 Signal processor
262 Electro-optic converter
301 Transmission system
311 Main device
312-1 to 312-8 Sub device
331 Controller
332, 333 Optical connector
361, 362 Optical connector

The invention claimed is:
1. A transmission system comprising a plurality of sub devices and a main device that are connected in a daisy chain, wherein
the main device includes
a first main connector connected to a first sub device of the plurality of sub devices, the first main connector being configured to output transmission signals of a plurality of channels, and
each of the plurality of sub devices includes:
a first sub connector connected to a preceding device, the first sub connector being configured to receive the transmission signals;
a compensation unit disposed to correspond to a channel obtained as a result of thinning out, at predetermined channel intervals, channels other than a channel of an own device signal that is the transmission signal used by the sub device to which the compensation unit belongs, the compensation unit being configured to perform compensation on the transmission signals; and
a second sub connector configured to shift, in a case where the second sub connector is connected to a following device, channels of the transmission signals received from the preceding device other than the own device signal by a number of channels of the own device signal and output the transmission signals.

2. The transmission system according to claim 1, wherein each of the plurality of sub devices further includes
a signal processor configured to process the own device signal.

3. The transmission system according to claim 2, wherein the signal processor detects a connection order of the sub device to which the signal processor belongs on a basis of whether or not the transmission signal has been input to the compensation unit.

4. The transmission system according to claim 3, wherein the signal processor controls timing with which the signal processor processes the own device signal on a basis of the connection order detected of the sub device to which signal processor belongs.

5. The transmission system according to claim 2, wherein the first sub connector receives the transmission signals and a control signal from each of the plurality of sub devices preceding the sub device to which the first sub connector belongs, and
the second sub connector outputs the transmission signals received from the preceding device other than the own device signal, the control signal from each of the plurality of sub devices preceding the sub device to which the second sub connector belongs, and a control signal of the sub device to which the second sub connector belongs.

6. The transmission system according to claim 5, wherein the signal processor generates a signal containing feedback information indicating a state of the own device signal as the control signal of the sub device to which the signal processor belongs.

7. The transmission system according to claim 6, wherein the main device further includes:
a second main connector connected to the sub device that is a last sub device of the plurality of sub devices, the second main connector being configured to receive the control signal from each of the plurality of sub devices; and
a controller configured to control the transmission signals on a basis of the feedback information contained in the control signal from each of the plurality of sub devices.

8. The transmission system according to claim 7, wherein the feedback information contains at least one of a delay time or intensity of the transmission signal used by each of the plurality of sub devices.

9. The transmission system according to claim 8, wherein the controller controls, on a basis of the delay time of the transmission signal used by each of the plurality of sub devices, timing with which the first main connector outputs the transmission signal of each channel.

10. The transmission system according to claim 8, wherein the controller controls, on a basis of the delay time of th transmission signal used by each of the plurality of sub devices, timing with which the signal processor of each of the plurality of sub devices processes the transmission signal.

11. The transmission system according to claim 8, wherein the controller controls intensity of the transmission signal of each channel on a basis of the intensity of the transmission signal used by each of the plurality of sub devices.

12. The transmission system according to claim 11, wherein the controller controls intensity of the transmission signal subjected to compensation in the compensation unit of each of the plurality of sub devices on a basis of the intensity of the transmission signal used by each of the plurality of sub devices.

13. The transmission system according to claim 5, wherein the second sub connector outputs the transmission signals other than the transmission signals received from the preceding device and the control signal from each of the plurality of sub devices preceding the sub device to which the second sub connector belongs with the channels shifted by the number of channels of the own device signal and outputs the control signal of the sub device to which the second sub connector belongs using a channel that becomes unoccupied as a result of shifting the channels.

14. The transmission system according to claim 2, wherein the transmission signal contains an image signal, and the signal processor performs processing of displaying an image based on the image signal contained in the own device signal.

15. The transmission system according to claim 1, wherein the compensation unit includes:
a converter configured to convert a form of the transmission signal; and
an inverse converter configured to inversely convert the form of the transmission signal converted by the converter.

16. The transmission system according to claim 15, wherein
the transmission signal is an optical signal,
the converter performs opto-electric conversion on the transmission signal, and
the inverse converter performs electro-optic conversion on the transmission signal.

17. The transmission system according to claim 1, wherein
the second sub connector of the sub device that is a last sub device of the plurality of sub devices is not connected to a following device.

18. A transmission method for a plurality of sub devices and a main device that are connected in a daisy chain, the transmission method comprising:
causing the main device to output transmission signals of a plurality of channels to the sub device that is a first sub device of the plurality of sub devices; and
causing each of the plurality of sub devices to perform compensation on the transmission signals obtained as a result of thinning out, at predetermined intervals, the transmission signals received from a preceding device other than an own device signal that is the transmission signal used by the sub device, shift, in a case where the sub device is connected to a following device, channels of the transmission signals received from the preceding device other than the own device signal by a number of channels of the own device signal, and output the transmission signals to the following device.

19. A transmission device comprising:
a first connector connected to a preceding device, the first connector being configured to receive a transmission signal;
a compensation unit disposed to correspond to a channel obtained as a result of thinning out, at predetermined intervals, channels other than a channel of an own device signal that is the transmission signal used by a sub device to which the compensation unit belongs, the compensation unit being configured to perform compensation on the transmission signal; and
a second connector configured to shift, in a case where the second connector is connected to a following device, channels of the transmission signals received from the preceding device other than the own device signal by a number of channels of the own device signal and output the transmission signals.

* * * * *